United States Patent
Shimamori

(10) Patent No.: US 6,204,650 B1
(45) Date of Patent: *Mar. 20, 2001

(54) POWER SUPPLY APPARATUS AND METHOD OF CONTROLLING POWER SUPPLY CIRCUIT FOR GENERATING A DC OUTPUT

(75) Inventor: Hiroshi Shimamori, Kanagawa (JP)

(73) Assignee: Fujitsu, Limited, Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,438

(22) Filed: Sep. 28, 1998

(30) Foreign Application Priority Data

Mar. 20, 1998 (JP) .................................. 10-072723

(51) Int. Cl.⁷ ........................................ G05F 1/56
(52) U.S. Cl. ..................... 323/283; 323/267; 363/65; 363/95
(58) Field of Search .................. 323/267, 271, 323/272, 283; 363/65, 71, 95, 97

(56) References Cited

U.S. PATENT DOCUMENTS

| 5,177,678 | * | 1/1993 | Ibori et al. | 363/98 |
| 5,355,077 | * | 10/1994 | Kates | 323/271 |
| 5,594,631 | * | 1/1997 | Katoozi et al. | 323/283 |
| 5,627,412 | * | 5/1997 | Beard | 363/65 |
| 5,672,958 | * | 9/1997 | Brown et al. | 323/272 |
| 5,705,920 | * | 1/1998 | Watanabe et al. | 363/95 |
| 5,771,163 | * | 6/1998 | Moriguchi et al. | 363/71 |
| 6,031,362 | * | 2/2000 | Bradley | 323/267 |

FOREIGN PATENT DOCUMENTS 58-39269   3/1983   (JP) .

* cited by examiner

*Primary Examiner*—Jeffrey Sterrett
(74) *Attorney, Agent, or Firm*—Armstrong Westerman Hattori McLeland & Naughton, LLP

(57) ABSTRACT

A electric power conversion unit generates a DC output according to a pulse signal from a PWM unit. An A/D conversion unit converts the output voltage from the electric power conversion unit into digital data. A digital filter amplifies the difference between the digital data output from the A/D conversion unit and a reference value. A pulse width computation unit computes the on-time of a pulse signal provided to the electric power conversion unit based on the output from the digital filter. The on-time is written to an on-time register. The PWM unit generates a pulse signal according to the cycle set in a cycle register and the on-time written to the on-time register, and provides the signal to the electric power conversion unit.

7 Claims, 20 Drawing Sheets

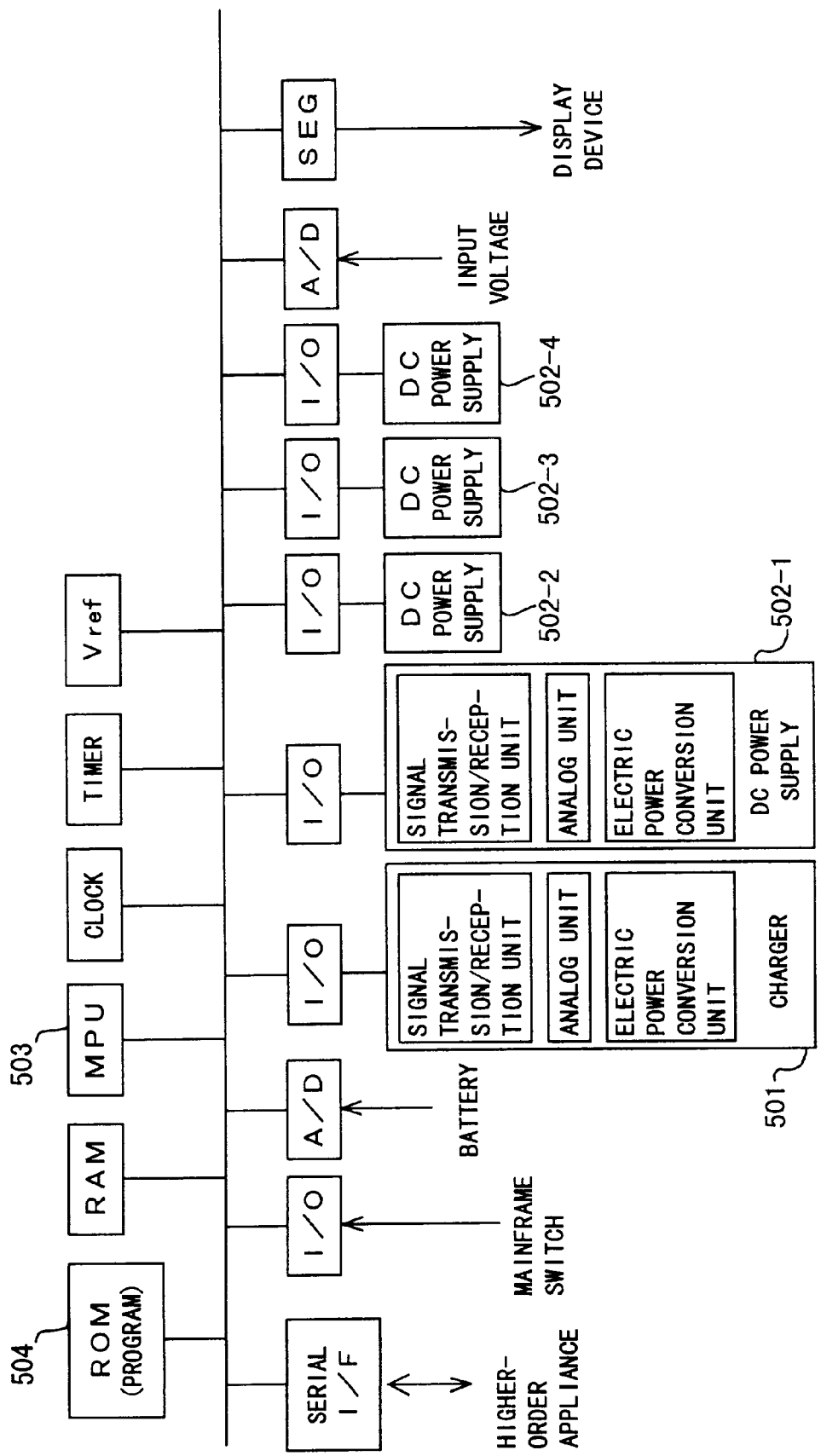
F I G. 1

| CURRENT STATE | DETECTION SIGNAL | NECESSARY DISCRIMINATION CONDITIONS IN DETERMINING NEXT STATE | | | | | | | | | |
|---|---|---|---|---|---|---|---|---|---|---|---|
| | | A OVER-VOLTAGE | B POWER-OFF | C INPUT VOLTAGE ≦5V, ≧19V | D OVER-CURRENT ≧3.5A | E RELEASE OF OVER-CURRENT ≦0.3A | F POWER-ON | G INPUT VOLTAGE ≧6V, ≦18V | H RELEASE OF ON SEQUENCE Vr≧2.5V | I RELEASE OF OFF SEQUENCE Vo≦0.2V | J DETECTION OF SHORT-CIRCUIT Vo≧1V |
| 01 | ON STATE | ○ | ○ | ○ | ○ | × | × | × | × | × | ○ |
| 02 | ON SEQUENCE | ○ | ○ | ○ | ○ | × | × | × | ○ | × | × |
| 03 | OFF STATE | × | ○*1 | × | × | ○ | ○ | ○ | × | × | × |
| 04 | OFF SEQUENCE | ○ | × | × | ○ | × | ○ | ○ | × | ○ | × |

○ : NECESSARY     × : UNNECESSARY

*1 OVERVOLTAGE LATCH IS RELEASED WHEN POWER-OFF IS DETECTED.

F I G. 1 4

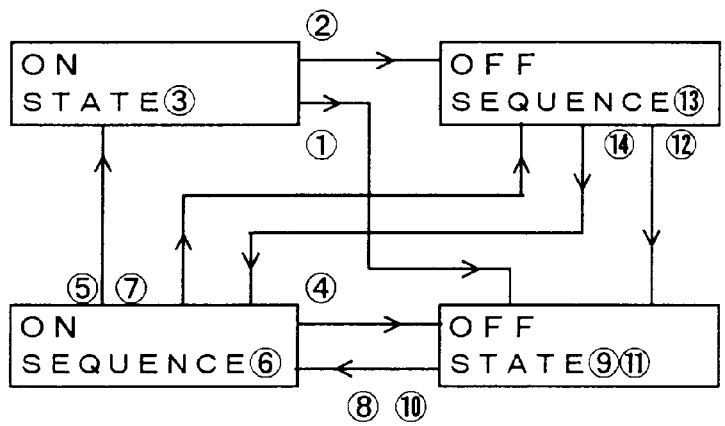

ON STATE

① $A+D+J=1$ INDICATES OFF STATE
② $(B+C)*\overline{(A+D+J)}=1$ INDICATES OFF SEQUENCE
③ $\overline{(B+C)}*\overline{(A+D+J)}=1$ INDICATES ON STATE

ON SEQUENCE

④ $A+D=1$ INDICATES OFF STATE
⑤ $\overline{(A+D)}*\overline{(B+C)}*H=1$ INDICATES ON STATE
⑥ $\overline{(A+D)}*\overline{(B+C)}*\overline{H}=1$ INDICATES ON SEQUENCE
⑦ $\overline{(A+D)}*(B+C)=1$ INDICATES OFF SEQUENCE

OFF STATE

⑧ $F*G=1$ INDICATES ON SEQUENCE
⑨ $F*G=0$ INDICATES OFF STATE
⑩ $E*F*G=1$ (WHEN OVERCURRENT STOPS) INDICATES ON SEQUENCE
⑪ $E*F*G=0$ (WHEN OVERCURRENT STOPS) INDICATES OFF STATE

※ OFF STATE IS ENTERED WHEN OVERVOLTAGE LATCH IS DETECTED.
(OVERVOLTAGE LATCH IS RELEASED WHEN B=1.)

OFF SEQUENCE

⑫ $A+D+I=1$ INDICATES OFF STATE
⑬ $\overline{(A+D+I)}*(F*G)=1$ INDICATES OFF SEQUENCE
⑭ $\overline{(A+D+I)}*\overline{(F*G)}=1$ INDICATES ON SEQUENCE

FIG. 16

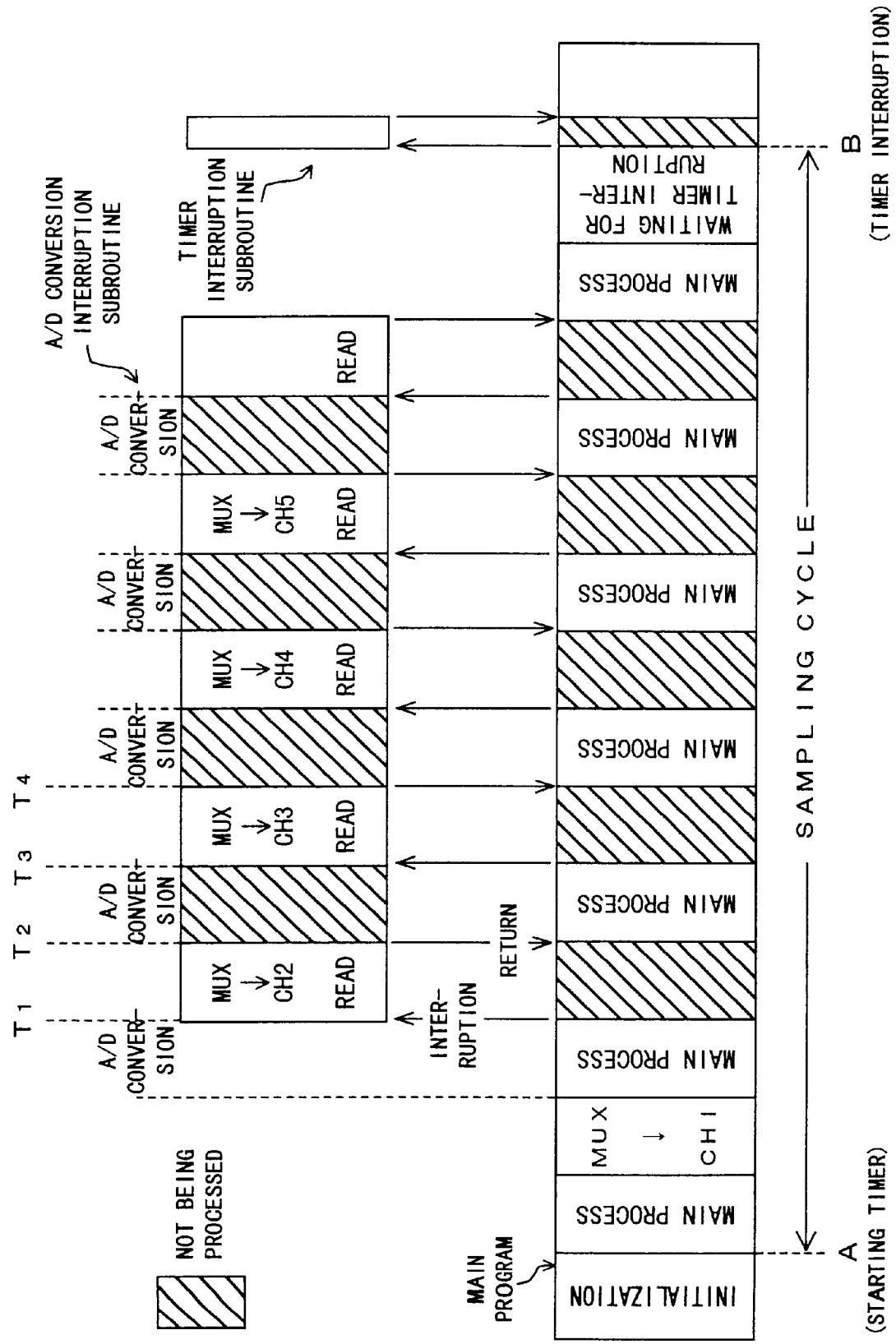
F I G. 18

POWER SUPPLY APPARATUS AND METHOD OF CONTROLLING POWER SUPPLY CIRCUIT FOR GENERATING A DC OUTPUT

BACKGROUND OF THE INVENTION

1. Field of the Invention

The present invention relates to a power supply apparatus provided with a power supply circuit for generating a DC output.

2. Description of the Related Art

A power supply apparatus such as an AC/DC converter, a DC/DC converter, a charger, etc. is popular in various fields. Generally, a power supply apparatus should be small in losses. Particularly, it is very important to reduce losses in a power supply apparatus used in a portable personal computer, a terminal unit in a mobile communications device, etc.

A personal computer, etc. normally demands different voltages. In response to this demand, a number of power supply apparatuses are designed to generate different voltages. Additionally, since various portable electric appliances are normally battery-powered, there are a large number of power supply apparatuses equipped with a charging function.

FIG. 1 shows the configuration of an example of a conventional power supply apparatus. The power supply apparatus comprises a charger 501 for charging a battery (not shown in FIG. 1) with electric energy, and plural DC power supplies 502-1 through 502-4 for providing electric currents for loads (not shown in FIG. 1).

A processor (MPU) 503 is an operating unit for controlling the operation of the power supply apparatus, and it communicates with a higher order appliance, controls a sequence, manages a battery, monitors and displays a state, etc. For example, when the power supply apparatus is provided in a computer, a higher order appliance can be the CPU (main processor) of the computer. When the processor 503 receives from the higher order unit, for example, an instruction to change a voltage level, it notifies the corresponding DC power supply of the instruction. The sequence control is a process in which the power is sequentially supplied to or disconnected from the plural DC power supplies 502-1 through 502-4 in a predetermined order. The battery control is the function of monitoring the residual charge in a battery, etc. The state monitor/display is the function of monitoring the input voltage to the power supply apparatus and the environmental temperature, and displaying them as necessary.

FIG. 2 shows the configuration of the charger or the DC power supply provided in the conventional power supply apparatus. The charger and the DC power supply basically have the same configurations, and individually include an electric power converter 510, an analog circuit unit 520, and a signal transmission/reception unit 530. In this example, the DC power supply is a DC/DC converter.

The electric power converter 510 includes a switching element (MOSFET) controlled according to the instruction from the PWM control circuit 524; a rectifying diode; an inductor for storing/discharging energy; a resistor for detecting an inductor current or an output current; and an output capacitor for smoothing an output. While the switching element is in an ON state, the inductor current ramps up with the electric current provided for the load, thereby storing residual charge in the output capacitor. On the other hand, while the switching element is in an OFF state, the inductor current ramps down and the electric charge stored in the output capacitor is discharged as necessary with the electric current provided for the load.

The analog circuit unit 520 includes an amplifier 521 for amplifying an inductor current or an output current; an amplifier 522 for amplifying the difference between the output from the amplifier 521 and a reference voltage Vref1; an amplifier 523 for amplifying the difference between the output voltage and a reference voltage Vref2, a PWM control circuit 524 for generating a PWM signal for controlling the switching element based on the output from these amplifiers, etc.; and an oscillator 525 for providing a clock at a predetermined frequency to the PWM control circuit 524.

When the output voltage becomes lower than the reference voltage Vref2, the PWM control circuit 524 sets to a high value the duty (duty cycle) of the PWM signal to be provided to the switching element so that the inductor current can be increased and the output voltage can become higher. On the other hand, when the output voltage becomes higher than the reference voltage Vref2, the PWM control circuit 524 sets to a low value the duty of the PWM signal so that the inductor current can be reduced and the output voltage can become lower. Thus, the output voltage can be can be maintained at a constant level. When the PWM control circuit 524 detects an overcurrent based on the output from the amplifier 522, it reduces the duty of the PWM signal or forcibly turns off the switching element.

The signal transmission/reception unit 530 includes a comparator, etc. for detecting a sudden decrease of an output voltage and generating an alarm signal. The signal transmission/reception unit 530 further includes the function of receiving a signal input from a high-order appliance.

Thus, the configuration for managing and controlling the operations of the power supply apparatus using a processor, etc. has been conventionally known. However, the output from the conventional charger or each DC power supply provided in a power supply apparatus has been individually adjusted under analog control.

The above described conventional power supply apparatus has the following problems.

(1) There has been remarkable progress in digital technology, and the performance of a processor has been greatly improved. As a result, a user can easily obtain a high-performance but inexpensive processor. However, in the method using the above described conventional power supply apparatus, the load of the processor (throughput) is low. Therefore, the user cannot make the most of a high-performance processor.

(2) The progress of analog technology has slowed down, and it seems to be difficult to reduce the losses or the scale of a circuit. Furthermore, using an analog circuit, parts may be replaced or the wiring pattern, etc. of the power supply apparatus may be changed if the specification of the power supply apparatus is amended.

(3) In the power supply apparatus, it is difficult to realize a small and inexpensive system because it requires a number of I/O or I/F circuits for transmitting signals between the processor and other circuits.

(4) An electric power converter and an analog circuit are normally produced independently. This is another factor for high production costs.

SUMMARY OF THE INVENTION

The present invention has been developed to solve the above described problems. That is, the object of the present invention is to provide a power supply apparatus which has small losses and allows its specification to be easily amended. Another object of the present invention is to realize a small and inexpensive power supply apparatus. A further object of the present invention is to provide a power supply apparatus capable of making the most of the performance of the processor.

The power supply apparatus according to the present invention is based on the configuration including a processor, a plurality of power supply circuits each generating a DC output, and a conversion unit for converting a parameter related to each output of the above described plurality of power supply circuits into digital data. The power supply apparatus makes the processor perform the process of controlling the output of the plurality of power supply circuits based on the digital data obtained from the conversion unit.

With the above described configuration, the function conventionally realized by an analog circuit can be replaced with the software process performed using a processor, thereby realizing a smaller circuit as a power supply apparatus.

The power supply apparatus according to another embodiment of the present invention includes a power supply circuit for generating a DC output according to a received pulse signal; a conversion unit for converting an output parameter related to an output from the power supply circuit; and an operation unit for amplifying the difference between the digital data obtained from the conversion unit and a reference value.

With the above described configuration, the reference value is a value for definition of an output of the power supply circuit, and a digital value corresponding to a parameter converted by the conversion unit. Accordingly, the operation unit and the generation unit perform a digital process. The digital process can be realized by executing a software program using a processor, etc.

The operation unit can be realized by, for example, a digital filter such as an IIR filter, an FIR filter, etc. When a DC output from the power supply circuit is controlled by the PWM system, the duty of a pulse signal to be provided to the power supply circuit is determined based on the difference between the digital data obtained from the conversion unit and the above described reference value. The process of determining the duty is also a digital process performed by executing a software program.

BRIEF DESCRIPTION OF THE DRAWINGS

FIG. 1 shows the configuration of an example of the conventional power supply apparatus;

FIG. 14 is a table showing the determination conditions for control of the state of the power supply circuit;

FIG. 16 shows the state transition of the power supply circuit;

FIG. 18 shows the operation performed by the program shown in FIG. 17;

DESCRIPTION OF THE PREFERRED EMBODIMENTS

The power supply apparatus according to the present embodiment is provided in a device such as a personal computer, etc., and comprises a charger for charging electric energy for a battery provided in the device; and a plurality of DC power supplies each generating a plurality of DC voltages used in the device. The charger and DC power supplies can be collectively referred to as a power supply circuit.

Each power supply circuit maintains each output voltage at a constant level by PWM (pulse width modulation). In PWM control for controlling the output voltage, the duty of the pulse provided for the power supply circuit is normally modified based on the difference between the output voltage of the power supply circuit and the reference voltage. The power supply circuit adjusts the output voltage according to the pulse signal. That is, the feedback control is performed. According to the present embodiment, the processor in the power supply apparatus performs the feedback control.

Figure 3:
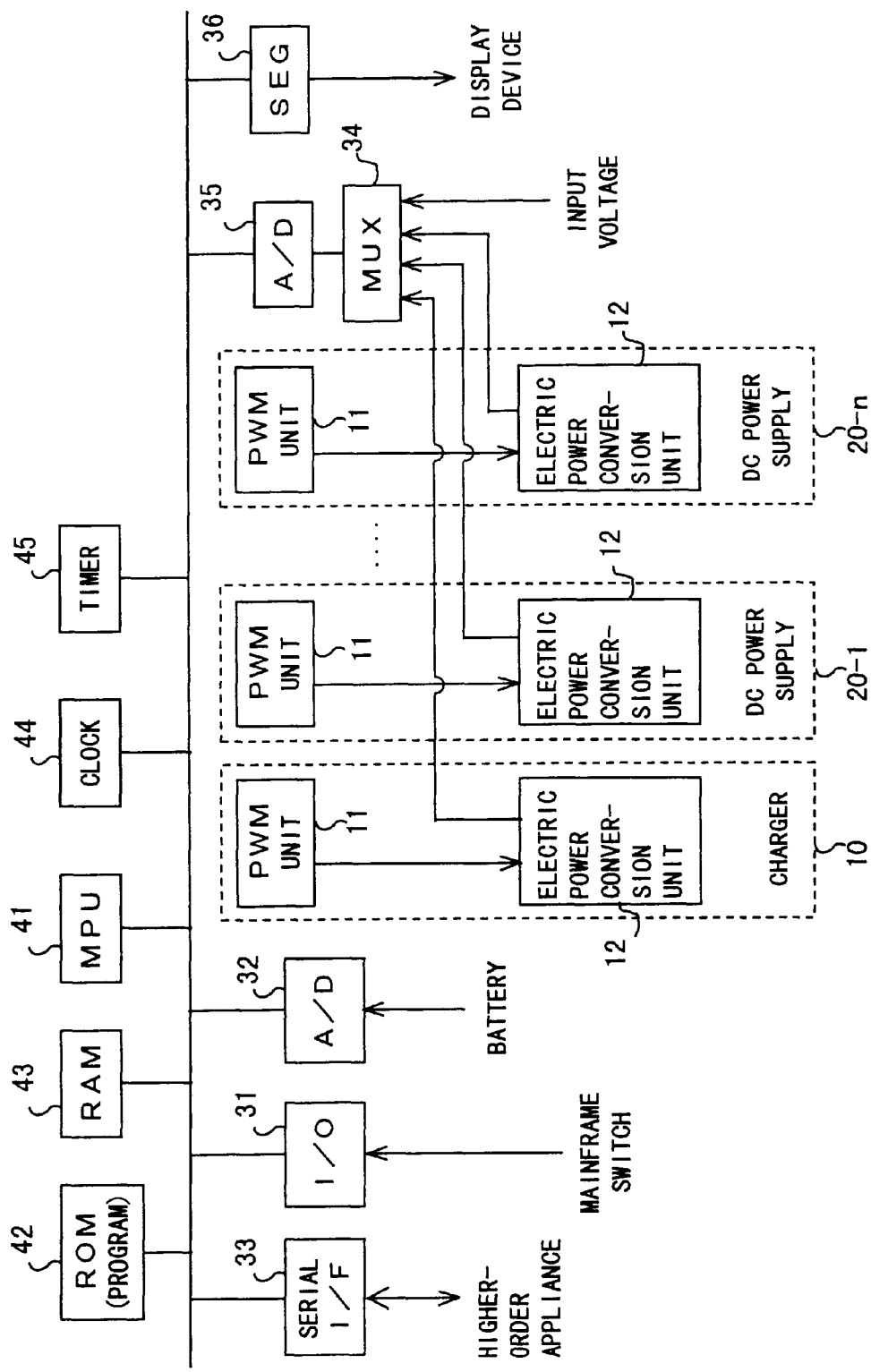
FIG. 3 shows the configuration of the power supply apparatus according to the present embodiment.

FIG. 3 shows the configuration of the power supply apparatus according to the present embodiment. A charger 10 charges a battery (not shown in FIG. 3) provided in the mainframe (personal computer, etc.) which includes the power supply apparatus. DC power supplies 20-1 through 20-n generate respective DC voltages and each of them provides the generated DC voltage to a load. The charger 10 and the DC power supplies 20-1 through 20-n have basically the same configurations, and comprise a PWM unit 11 and an electric power conversion unit 12.

An I/O unit 31 receives an ON/OFF signal from a switch in the mainframe comprising the power supply apparatus, and notifies a processor (MPU) 41 of the signal. An A/D conversion unit 32 converts the information (for example, the remaining charge in the battery) relating to the battery charged by the charger 10 into digital data, and transmits it to the processor 41. A serial I/F unit 33 controls the transmission and reception of the information between the processor 41 and a higher-order appliance. A higher-order appliance refers to, for example, the CPU (main processor) in the mainframe which includes the power supply apparatus. In this example, the higher-order appliance transmits a signal indicating the reduction of an output voltage to the power supply apparatus when the operation mode is switched from the normal mode to the resume mode.

A multiplexing unit (MUX) 34 receives a feedback signal from the electric power conversion unit 12 in each power supply circuit (the charger 10 and the DC power supplies 20-1 through 20-n), and an input voltage provided to each power supply circuit, and selects and outputs a predetermined signal according to the instruction from the processor 41. A feedback signal from the electric power conversion unit 12 is a parameter relating to the output from the power supply circuit. It is, for example, an output voltage, an output current, etc. from each power supply circuit. An A/D conversion unit 35 converts an output from the multiplexing unit 34 into digital data. The digital data converted by the A/D conversion unit 35 is read by the processor 41. A segment controller (SEG) 36 outputs a signal for display of the remaining charge in the battery, etc. on a display device, not shown in FIG. 3.

The processor 41 executes the program stored in the ROM 42 using the RAM 43. The program executed by the processor 41 describes the procedure of the process for controlling the operation of the power supply apparatus according to the digital data from the I/O unit 31, the A/D conversion unit 32, the serial I/F unit 33, and the A/D conversion unit 35. The program is stored in the ROM area 42 in FIG. 3, and can be designed to be rewritten. Additionally, a DSP (digital signal processor) can be used as the processor 41.

With the above described configuration, the processor 41 performs the processes of the above described conventional technology, that is, the sequence control, the battery management, the state monitor/display, etc., and controls the output voltage of the power supply circuit so that the output voltage can be maintained at a predetermined level. The power supply apparatus further comprises a clock generation unit 44 for generating a clock signal, and a timer 45.

Figure 2:
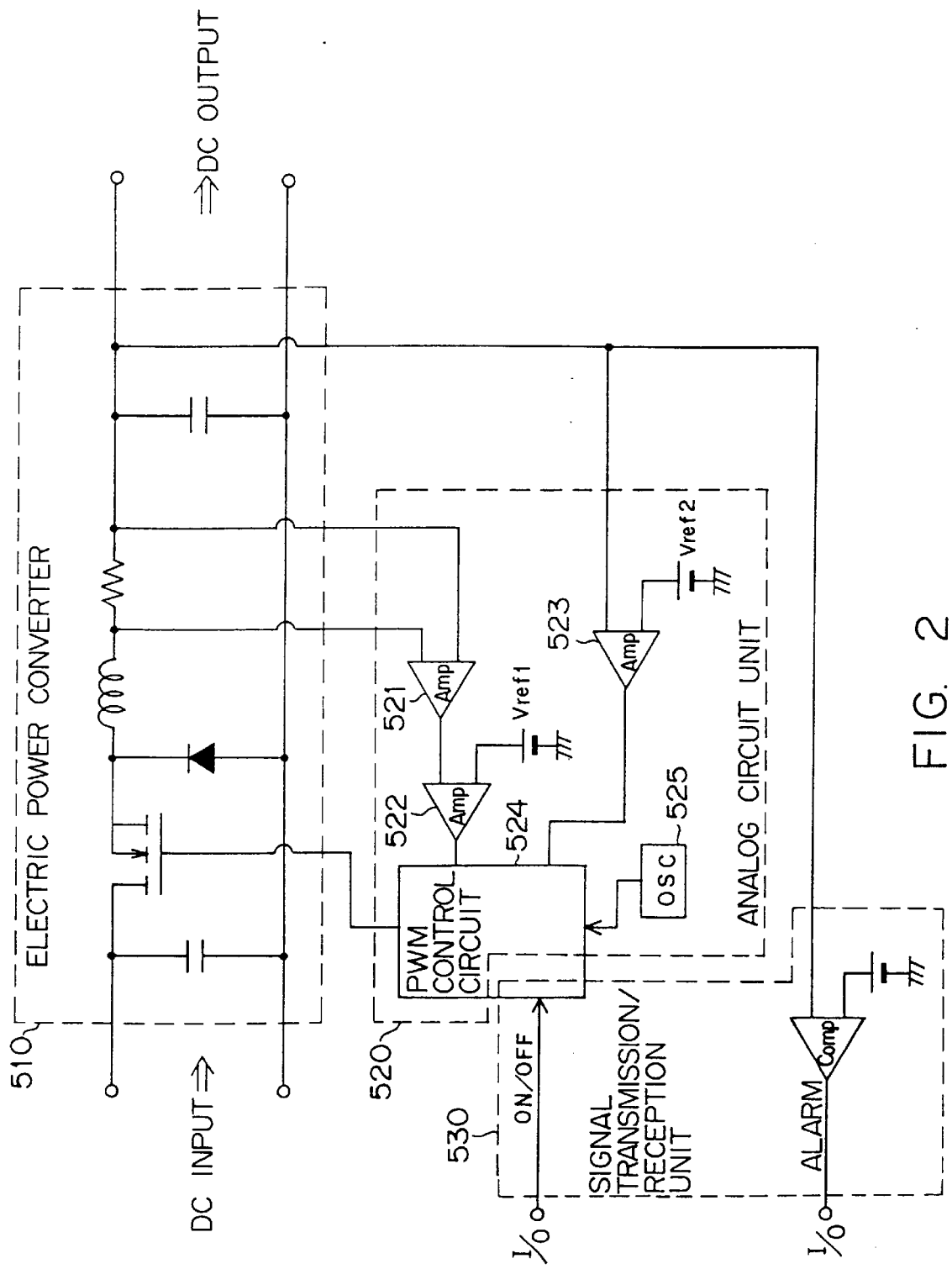
FIG. 2 shows the configuration of the charger or the DC power supply provided in the conventional power supply apparatus.
Figure 4:
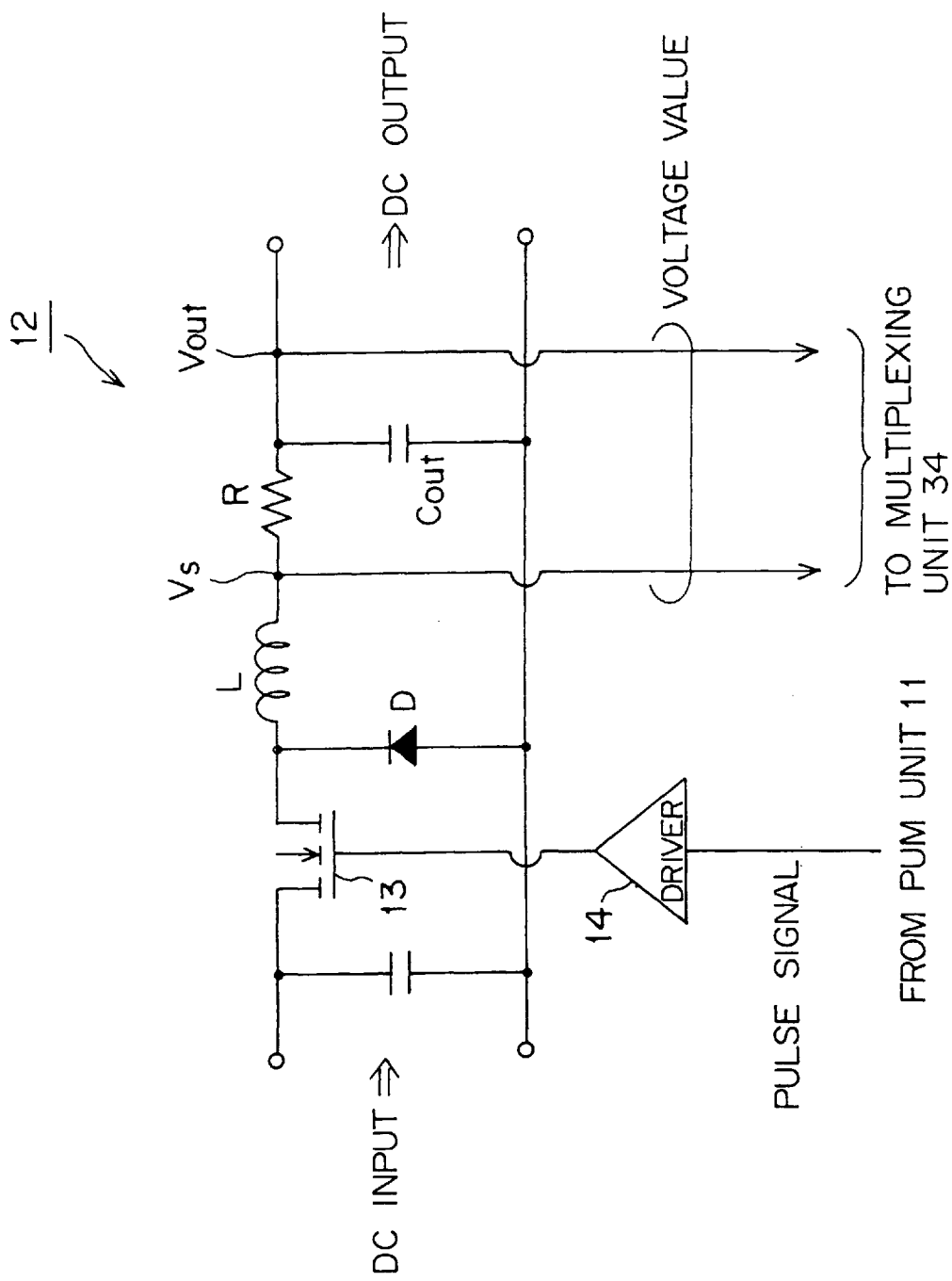
FIG. 4 shows the configuration of the electric power conversion unit.

FIG. 4 shows the configuration of the electric power conversion unit 12. The electric power conversion unit 12 is basically the same as the conventional electric power conversion unit shown in FIG. 2. That is, the electric power conversion unit 12 comprises a switching element 13 (MOSFET in FIG. 4) controlled according to an instruction from the PWM unit 11, a rectifying diode D, an inductor L for storing/discharging energy, a resistor R for detecting an inductor current or an output current, and an output capacitor Cout for smoothing the output. The electric power conversion unit 12 comprises a driver (driving circuit) 14 for driving the switching element 13 by amplifying a pulse signal from the PWM unit 11. The above described rectifying diode D can be replaced by a MOS transistor, etc. In this case, the two MOS transistors are turned on/off according to switching control signals having opposite phases to each other, which prevents them from being simultaneously in an ON state.

A DC input is generated by an AC/DC converter or a DC/DC converter. A DC output is provided for a load (including a battery).

With the above described configuration, the inductor current ramps up while the switching element 13 is in the ON state, and an electric current is provided to a load with the residual charge stored in the output capacitor Cout. While the switching element 13 is in the OFF state, the inductor current ramps down, and the electric current is provided to the load with the charge stored in the output capacitor Cout discharged as necessary. Therefore, the output voltage from the electric power conversion unit 12, that is, the output voltage from each power supply circuit, can be modified according to the ON-to-OFF rate (duty cycle) of the switching element 13.

The ON/OFF state of the switching element 13 can be controlled according to a pulse signal generated by the PWM unit 11. In the present embodiment, the H of the pulse signal corresponds to the ON state of the switching element 13, and the L of the pulse signal corresponds to the OFF state of the switching element 13.

In the PWM, the cycle of the pulse signal for control of the switching element 13 is normally constant. Therefore, to specify the duty of the pulse signal, the H time or the L time within one cycle of the pulse signal can be specified. According to the present embodiment, the duty can be specified by specifying the cycle and the H time of the pulse signal. Since the H of the pulse signal corresponds to the ON state of the switching element 13, the H period of the pulse signal can be referred to as 'on-time Ton'.

The electric power conversion unit 12 transmits as a feedback signal a parameter relating to the output from the power supply circuit to the multiplexing unit 34. The parameters used in the present embodiment are a voltage (output voltage Vout) of an output terminal and a voltage (voltage Vs) at the junction of the inductor L and the resistor R. As described above, these parameters are converted by the A/D conversion unit 35 into digital data and transmitted to the processor 41. The processor 41 detects the output voltage Vout using the digital data, and detects an output current by computing (voltage Vs−output voltage Vout)/R.

Figure 5:
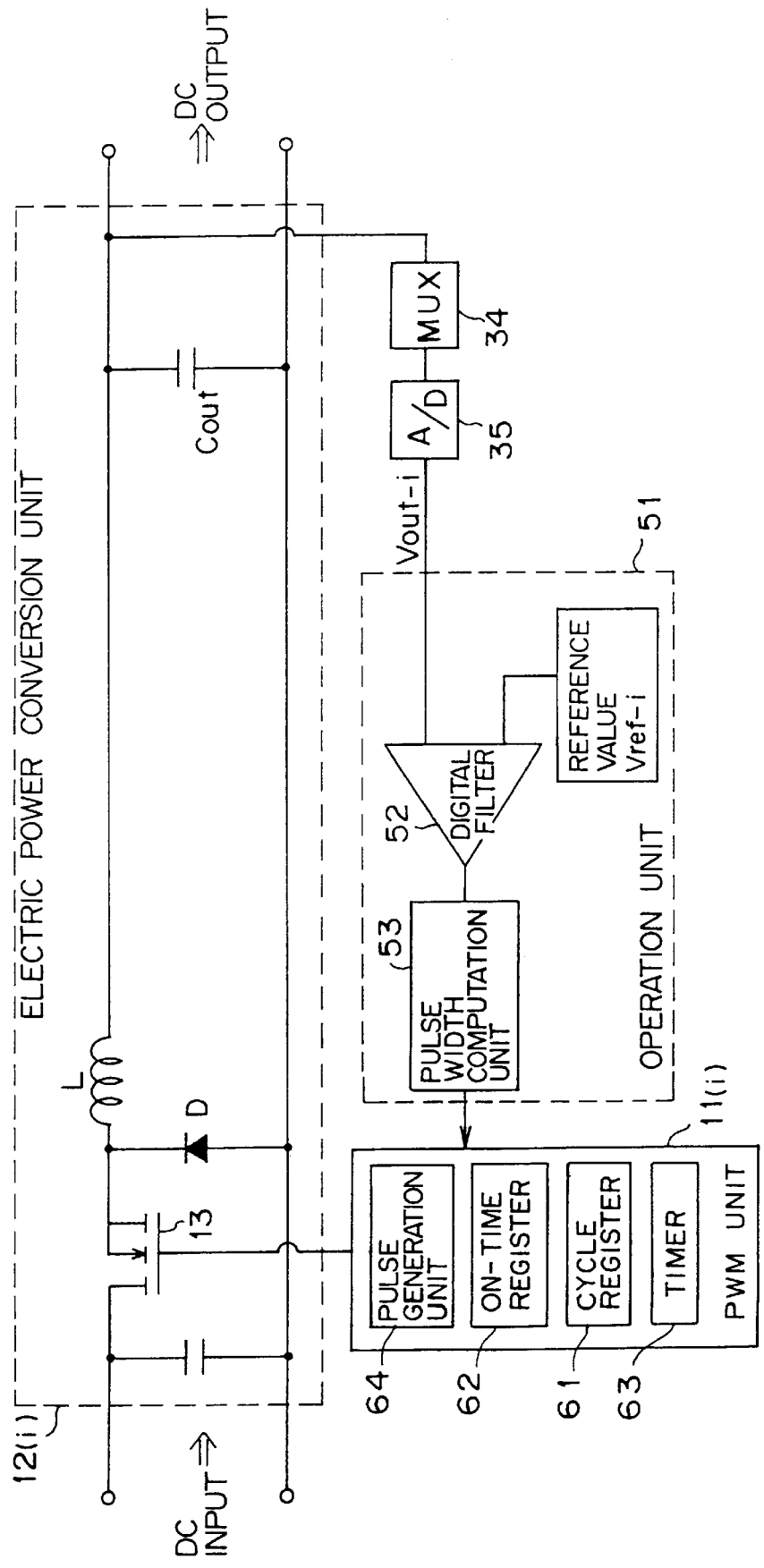
FIG. 5 shows the control of the output voltage according to an embodiment of the present invention.

FIG. 5 shows the control of an output voltage according to the present embodiment. In this example, optional power supply circuits in the charger 10 and the DC power supplies 20-1 through 20-n shown in FIG. 3 are mainly described. In FIG. 5, the target power supply circuit is identified by i. In FIG. 5, elements not directly related to the control of an output voltage are omitted.

An operation unit 51 computes the pulse width (that is, the duty) of a pulse signal for control of the switching element 13 of the electric power conversion unit 12 according to the parameter received from the electric power conversion unit 12 through the A/D conversion unit 35. In this example, the parameter is an output voltage of the electric power conversion unit 12. Therefore, the operation unit 51 receives Vout, that is, the value obtained by converting an output voltage into digital data. The operation unit 51 can be realized by the processor 41 executing a predetermined program stored in the ROM 42.

An operation unit 51 comprises a digital filter 52 and a pulse width computation unit 53. As described later in detail, the digital filter 52 amplifies the difference between the output voltage Vout and the reference value Vref, and output the result. The reference value Vref is an equivalent value for the output voltage to be held by the power supply circuit. Assuming that the output voltage to be held by the power supply circuit is 2.5V, the reference value Vref is digital data obtained from the A/D conversion unit 35 when '2.5V' is input to the A/D conversion unit 35. The program storing the process of controlling the output voltages of the charger 10 and the DC power supplies 20-1 through 20-n is basically the same, but contains different reference values Vref to obtain different output voltages.

As described later in detail, the pulse width computation unit 53 computes the on-time Ton based on the output from the digital filter 52. The on-time refers to the time when the switching element 13 is in the ON state within the switching cycle of the switching element 13. The pulse width computation unit 53 writes the on-time to an on-time register 62 of the PWM unit 11.

The PWM unit 11 comprises a cycle register 61, the on-time register 62, a timer 63, and a pulse generation unit 64. The cycle register 61 is a storage area for storing the cycle of an output pulse signal. The cycle of the pulse signal is the switching cycle of the switching element 13, and is written to the cycle register 61 in the initialization sequence of the power supply apparatus. The on-time register 62 is a storage area for storing the on-time computed by the operation unit 51. The timer 63 counts the elapsed time from the leading edge to the trailing edge of a pulse signal. The pulse generation unit 64 uses the timer 63 to generate the pulse signal based on the cycle stored in the cycle register 61 and the on-time stored in the on-time register 62.

As described above, the output from the PWM unit 11 is used as a switching signal for control of the switching element 13 in the electric power conversion unit 12.

Thus, since the power supply apparatus according to the present embodiment performs the function of the analog unit of the conventional power supply apparatus with the operation unit 51 and the PWM unit 11, the circuit scale can be smaller. Furthermore, according to the present embodiment, since an analog circuit can be replaced with a digital circuit, an A/D converter is required. However, a plurality of power supply circuits can share one A/D converter by using the multiplexing unit 34. Therefore, the circuit scale does not become so large. Furthermore, in the power supply apparatus according to the present embodiment, all units other than the electric power conversion unit 12 can be incorporated into an LSI, thus realizing a small, low-cost, and high-performance system. The present embodiment also has the configuration in which the analog unit in the conventional power supply apparatus is described in a software program. Therefore, even when the function provided by a conventional analog circuit should be amended, it can be amended simply by rewriting the program.

Figure 6A:
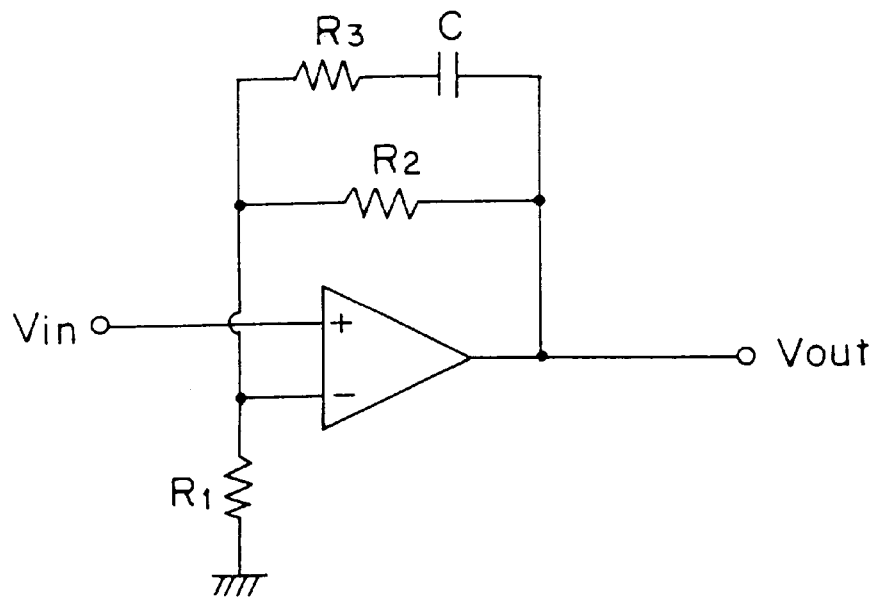
FIG. 6A shows a practical circuit of an amplifier used in the conventional power supply apparatus.

Described below is the method of realizing the operation unit 51. The digital filter 52 is basically designed to implement the characteristics as they are (especially the G-Φ characteristic) of the amplifier 523 used in the conventional power supply apparatus shown in FIG. 2. FIG. 6A shows an example of a practical circuit of the amplifier 523 used in the conventional power supply apparatus. The transfer function of the amplifier is described below.

$$G_{(s)} = \frac{R_1 + R_2}{R_1} \cdot \frac{1 + sc(R_3 + R_1 // R_2)}{1 + sc(R_2 + R_3)}$$

$$= \frac{\alpha(1 + s\gamma)}{1 + s\beta}$$

$$G(j\omega) = \frac{\alpha\{1 + \omega^2\beta\gamma + j\omega(\gamma - \beta)\}}{1 + \omega^2\beta^2}$$

$$\left(\alpha = \frac{R_1 + R_2}{R_1}, \gamma = c(R_3 + R_1 // R_2), \beta = c(R_2 + R_3)\right)$$

As a digital filter, for example, an FIR (finite impulse response) filter and an IIR (infinite impulse response) filter are popular. The digital filter 52 can be realized by either of these, but the IIR filter is used in the present embodiment.

To assign the characteristics of an analog amplifier (analog filter) to an IIR filter, the s-z transformation is adopted. The s-z transformation refers to a method of converting a transfer function G(s) of an analog filter in an s area into a z area.

Figure 6B:
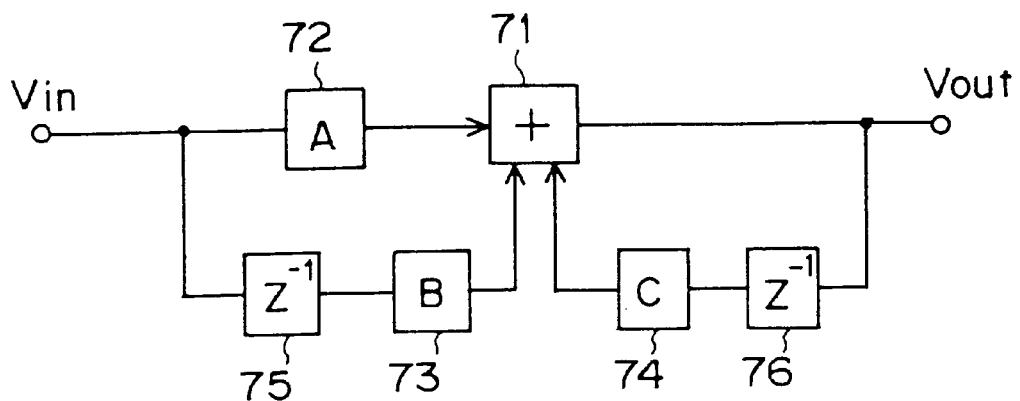
FIG. 6B shows a digital filter generated using the IIR and equivalent to the amplifier shown in FIG. 6A.

FIG. 6B shows a digital filter which is generated using the IIR and is equivalent to the amplifier (analog filter) shown in FIG. 6A. The digital filter comprises an adder 71, factor multipliers 72 through 74, and unit delay elements 75 and 76. The method of replacing the amplifier shown in FIG. 6A with the digital filter shown in FIG. 6B is well-known, but is described below for confirmation.

Described below is the transfer function in the z area.

$$s = \frac{2(1 - Z^{-1})}{T_s(1 + Z^{-1})} \quad (1)$$

$$G_{(z)} = \frac{R_1 + R_2}{R_1} \cdot \frac{T_s + 2c(R_3 + R_1 // R_2) + \{T_s - 2c(R_3 + R_1 // R_2)\} \cdot Z^{-1}}{T_s + 2c(R_2 + R_3) + \{T_s - 2c(R_2 + R_3)\} \cdot Z^{-1}}$$

$$= \frac{\alpha \cdot \{T_s + 2\gamma + (T_s - 2\gamma) \cdot Z^{-1}\}}{T_s + 2\beta + (T_s - 2\beta) \cdot Z^{-1}}$$

$$= \alpha \cdot \frac{T_s - 2\gamma}{T_s - 2\beta} \cdot \frac{\frac{T_s + 2\gamma}{T_s - 2\gamma} + Z^{-1}}{\frac{T_s + 2\beta}{T_s - 2\beta} + Z^{-1}}$$

$$= \alpha \cdot a \cdot \frac{b + Z^{-1}}{c + Z^{-1}}$$

$$\left[\alpha = \frac{T_s - 2\gamma}{T_s - 2\beta}, b = \frac{T_s + 2\gamma}{T_s - 2\gamma}, c = \frac{T_s + 2\beta}{T_s - 2\beta}\right] \quad (2)$$

$$G(e^{j\omega T_s}) = \alpha \cdot a \frac{b + \cos(\omega T_s) - j \cdot \sin(\omega T_s)}{c + \cos(\omega T_s) - j \cdot \sin(\omega T_s)}$$

$$= \frac{\alpha \cdot a\{(b + \cos(\omega T_s)) \cdot (c + \cos(\omega T_s)) + \sin^2(\omega T_s) + j(b - c) \cdot \sin(\omega T_s)\}}{(c + \cos(\omega T_s))^2 + \sin^2(\omega T_s)}$$

The following results are obtained by the above listed equations (1) and (2).

$$Y_{(n)} = \frac{\alpha \cdot a \cdot b}{c} \cdot x_{(n)} + \frac{\alpha \cdot a}{c} \cdot x_{(n-1)} - \frac{1}{c} \cdot Y_{(n-1)} \quad (3)$$

$$= A \cdot x_{(n)} + B \cdot x_{(n-1)} - C \cdot Y_{(n-1)}$$

$$A = \frac{R_1 + R_2}{R_1} \cdot \frac{T_s + 2c(R_3 + R_1 // R_2)}{T_s + 2c(R_2 + R_3)} \quad (4)$$

$$B = \frac{R_1 + R_2}{R_1} \cdot \frac{T_s + 2c(R_3 + R_1 // R_2)}{T_s + 2c(R_2 + R_3)} \quad (5)$$

$$C = -\frac{T_s - 2c(R_2 + R_3)}{T_s + 2c(R_2 + R_3)} \quad (6)$$

The configuration shown in FIG. 6B can be obtained by the equation (3) above. The factors set by the factor multipliers 72 through 74 are represented by the equations (4) through (6) above.

The equation (3) above (including the equations (4) through (6)) is described in a software program, and the digital filter 52 can be realized by the processor 41 executing the program. Thus, according to the present embodiment, the operations and the characteristics of an analog amplifier used in the conventional power supply apparatus are described by a software program, and the program is executed to provide the operations of the analog amplifier. Therefore, the characteristics of the analog amplifier can be amended simply by rewriting the program.

Figure 7:
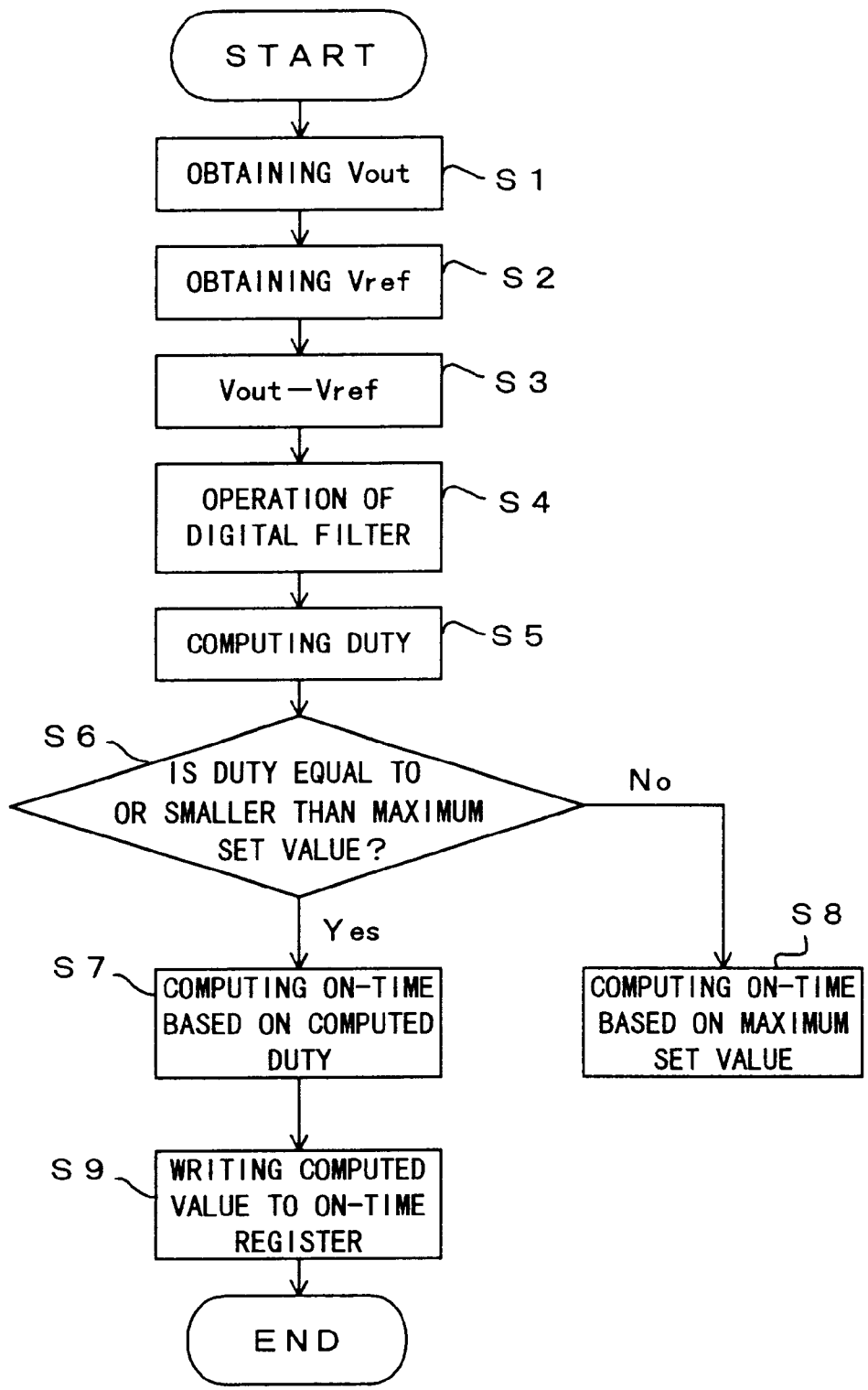
FIG. 7 is a flowchart showing the operation performed by the operation unit.

FIG. 7 is a flowchart showing the operation of the operation unit 51. In this example, as described by referring to FIG. 5, an optional power supply circuit in the DC power supplies 20-1 through 20-n is selected for description. It is assumed that the reference value Vref is predetermined. The process shown in this flowchart is performed for each of the predetermined intervals by a timer interruption, etc.

An output voltage Vout is obtained in step S1. Practically, the processor 41 first specifies one of the plurality of power supply circuits, and notifies the multiplexing unit 34 of the specified power supply circuit. The output voltages from the plurality of power supply circuits are input to the multiplexing unit 34. According to the notification from the processor 41, the output voltage from the specified power supply circuit is output to the A/D conversion unit 35. The processor 41 reads digital data (output voltage Vout), that is, the conversion result from the A/D conversion unit 35.

The reference value Vref is obtained in step S2. In step S3, the difference between the output voltage Vout obtained in step S1 and the reference value Vref obtained in step S2 is computed. In step S4, an operation for a digital filter is performed. In this process, the computation result in step S3 is input to the digital filter shown in FIG. 6B. Practically, the computation result in step S3 is substituted for the equation (3) above.

Figure 8:
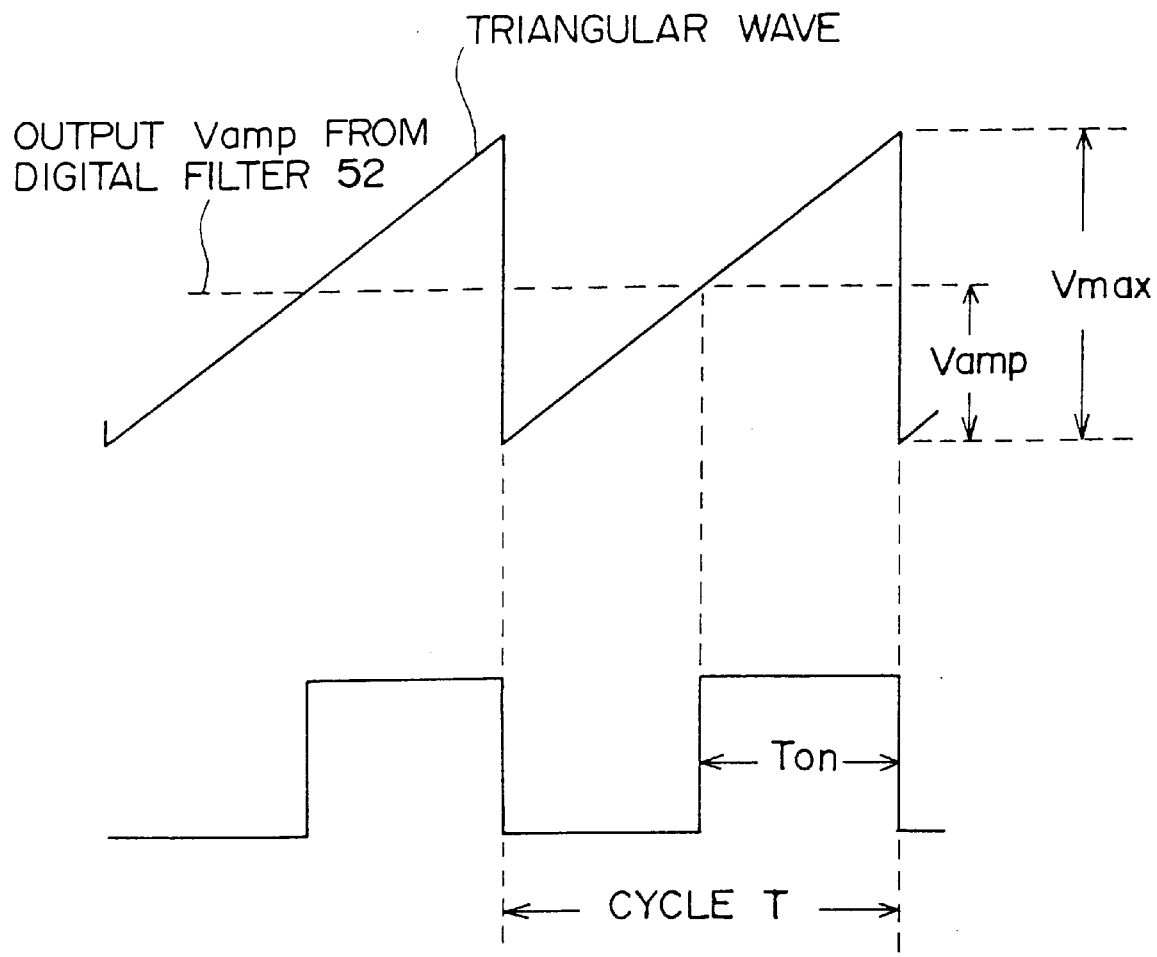
FIG. 8 shows the duty of a pulse signal.

In step S5, the duty of the pulse signal generated by the PWM unit 11 is computed based on the result of the operation for the digital filter. Briefly described below by referring to FIG. 8 is the duty of the pulse signal.

The pulse signal is normally generated using a triangular wave in an analog circuit. Using a triangular wave, the process performed in step S5 corresponds to the process of comparing the level of the triangular wave with the result of the operation of the digital filter. Assuming that the output from the digital filter 52 is Vamp, the cycle of the triangular wave is T, and the maximum value of the triangular wave is Vmax, the duty of the generated pulse signal is represented by the following equation.

$$D=Ton/T=(Vmax-Vamp)/Vmax \quad (7)$$

Therefore, according to the present embodiment, the duty of a pulse signal is obtained using a predetermined maximum value Vmax of the triangular wave by substituting the output from the digital filter 52 in the equation (7) above.

In step S6, it is checked whether or not the duty obtained in step S5 is equal to or smaller than a predetermined maximum set value. If it is determined that the duty obtained in step S5 is equal to or smaller than the predetermined maximum set value, then the on-time Ton is computed using the duty obtained by the equation (7) above in step S7. That is, the operation Ton=D·T is performed. On the other hand, when the duty obtained in step S5 is larger than the predetermined value, the on-time Ton is obtained using the maximum set value Dmax in step S8 instead of the duty D obtained in step S5. That is, the operation Ton=Dmax·T is performed.

In step S9, the on-time computed in step S7 or S8 is written to the on-time register 62 in the PWM unit 11.

The processes in the above described steps S1 through S9 are repeated at predetermined intervals. Therefore, the on-time corresponding in real time to the output voltage of a power supply circuit is constantly written to the on-time register 62. The above described process is cyclically performed on a plurality of power supply circuits. Each operation result is written to the on-time register 62 of the PWM unit 11.

Figure 9:
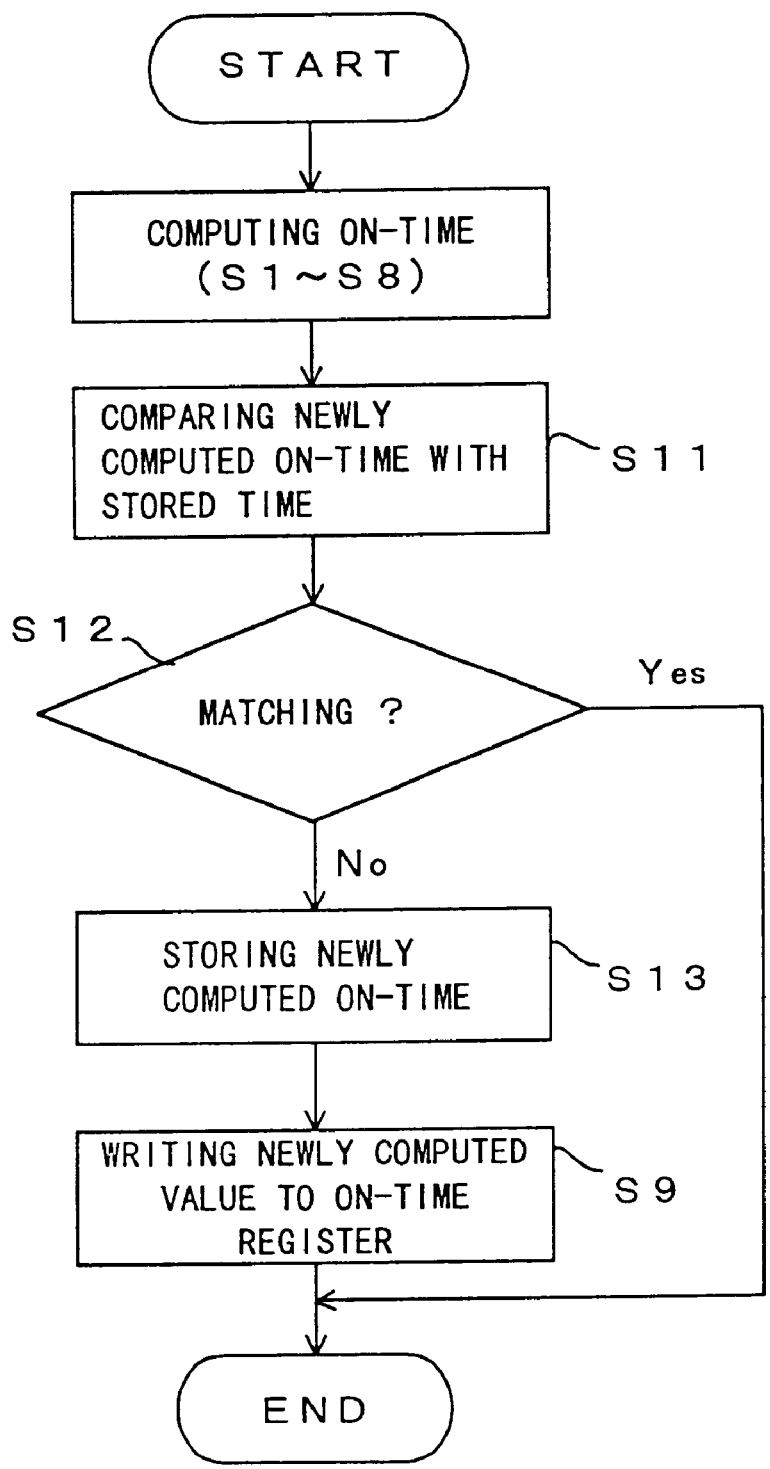
FIG. 9 shows an example of a variation of the process shown in FIG. 7.

FIG. 9 shows an example of a variation of the process shown in FIG. 7. In the process shown in FIG. 7, the on-time register 62 is updated each time the on-time is computed. On the other hand, in the process shown in FIG. 9, the access from the processor 41 to the on-time register 62 is omitted when a newly computed on-time has already been written to the on-time register 62.

The process of computing the on-time is the same as the process in steps S1 through S8 shown in FIG. 7. In steps S11 and S12 of FIG. 9, a newly computed on-time is compared with the on-time obtained in the previous operation and stored in the RAM 43. When the two on-times match each other, it is assumed that the newly computed on-time has already been written to the on-time register 62 of the PWM unit 11, and the process terminates without access to the PWM unit 11. On the other hand, if the above described two on-times do not match each other, the newly computed on-time is stored in the RAM 43 in step S13, and the on-time previously stored in the RAM 43 is deleted. Then the on-time register 62 is updated based on the newly computed on-time in step S9.

In the above described process, the number of signals transmitted between the processor 41 and the PWM unit 11 can be reduced.

Described below is the method of determining the triangular wave used in computing the duty of a pulse signal. When the output voltage of the power supply circuit is adjusted by controlling the ON/OFF state of the switching element in the PWM system, the duty of a pulse signal is normally approximated by the following equation. The VIN refers to a DC voltage input to the power supply circuit, and the VOUT refers to the output voltage of the power supply circuit.

$$D=VOUT/VIN \quad (8)$$

Thus, the maximum value Vmax of a triangular wave is represented as follows by the equations (7) and (8) above.

$$Vmax=Vamp \cdot VIN/(VIN-VOUT) \quad (9)$$

where Vamp is an output from the digital filter 52, and varies depending on the input voltage VIN provided for the power supply circuit. That is, Vamp increases with an increase of VIN. Therefore, it is desired that the mean value of the Vamp matches the center of the output range of the digital filter 52.

Assuming that, for example, the output range of the digital filter 52 is 5v and an input voltage is 12.5v, the Vmax of the triangular wave for the power supply circuit which should hold the voltage of 2.5v is 3.125V as computed by substituting the above listed values in the equation (9) above.

Described below is the process performed by the PWM unit 11. The PWM unit 11 generates a pulse signal based on the cycle T stored in the cycle register 61 and the on-time Ton stored in the on-time register 62.

Figure 10A:
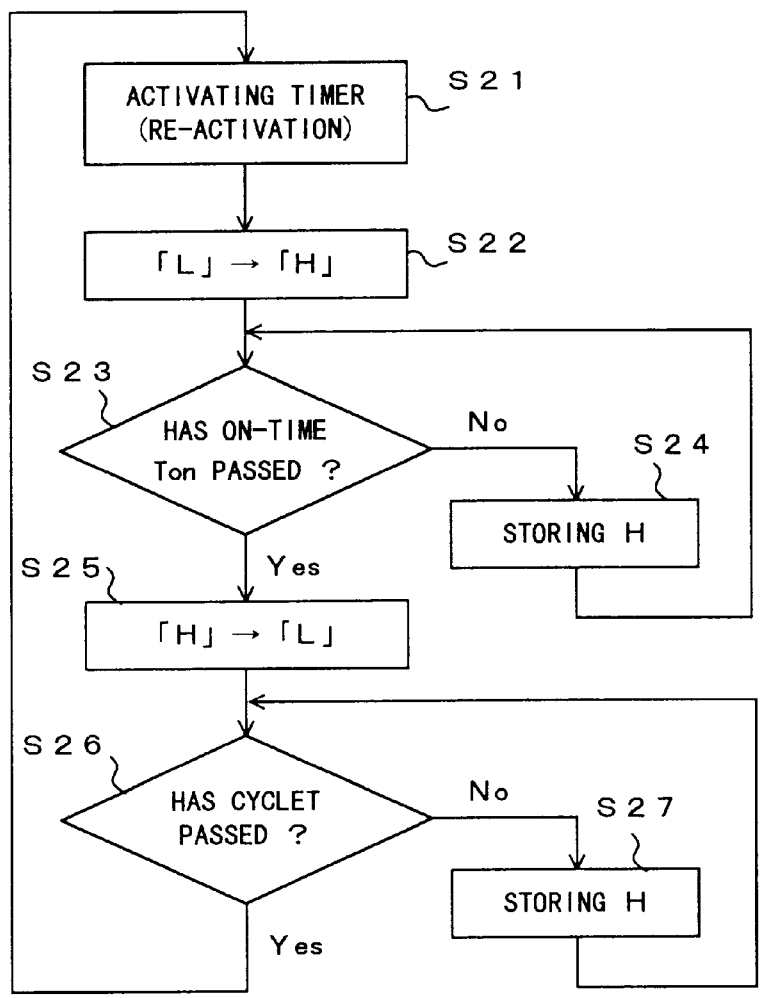
FIG. 10A is a flowchart showing the operation performed by the pulse generation unit.

FIG. 10A is a flowchart showing the operations of the pulse generation unit 64. In step S21, the timer 63 is activated. In step S22, the output of the PWM unit 11 is switched from an L level to an H level when the timer is activated. In steps S23 and S24, the output from the PWM unit 11 is held at the H level until the elapsed time from the activation of the timer 63 reaches the on-time Ton stored in the on-time register 62.

When the elapsed time from the activation of the timer in step S21 reaches the on-time Ton, the output from the PWM unit 11 is switched from the H level to the L level. In steps S26 and S27, the output from the PWM unit 11 is held at the L level until the elapsed time from the activation of the timer 63 reaches the cycle T stored in the cycle register 61. When the elapsed time from the activation of the timer in step S21 reaches the cycle T, control is returned to step S21 and the timer 63 is reactivated.

Figure 10B:
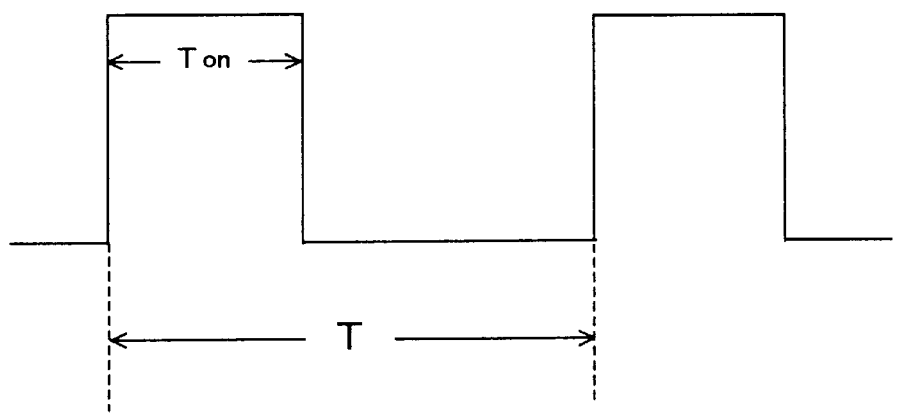
FIG. 10B shows an example of a generated pulse signal.

The pulse signal shown in FIG. 10B is generated by repeatedly performing the above described process. According to the pulse signal, the switching element 13 of the electric power conversion unit 12 is controlled.

Thus, the power supply apparatus according to the present embodiment generates a pulse signal for control of the switching element 13 in the software process. As a result, the output voltage of each power supply circuit can be set, and the switching frequency, the response characteristics, etc. of the switching element 13 can be easily amended by rewriting the program. For example, the output voltage can be set by setting the reference value Vref. The switching frequency is determined by the frequency of the triangular wave. Furthermore, the response characteristic can be changed with a factor of a digital filter.

According to the embodiment shown in FIG. 5, an output voltage is used as a parameter relating to the output from the power supply circuit. However, the operation of the electric power conversion unit can be controlled based on the output current.

Figure 11:
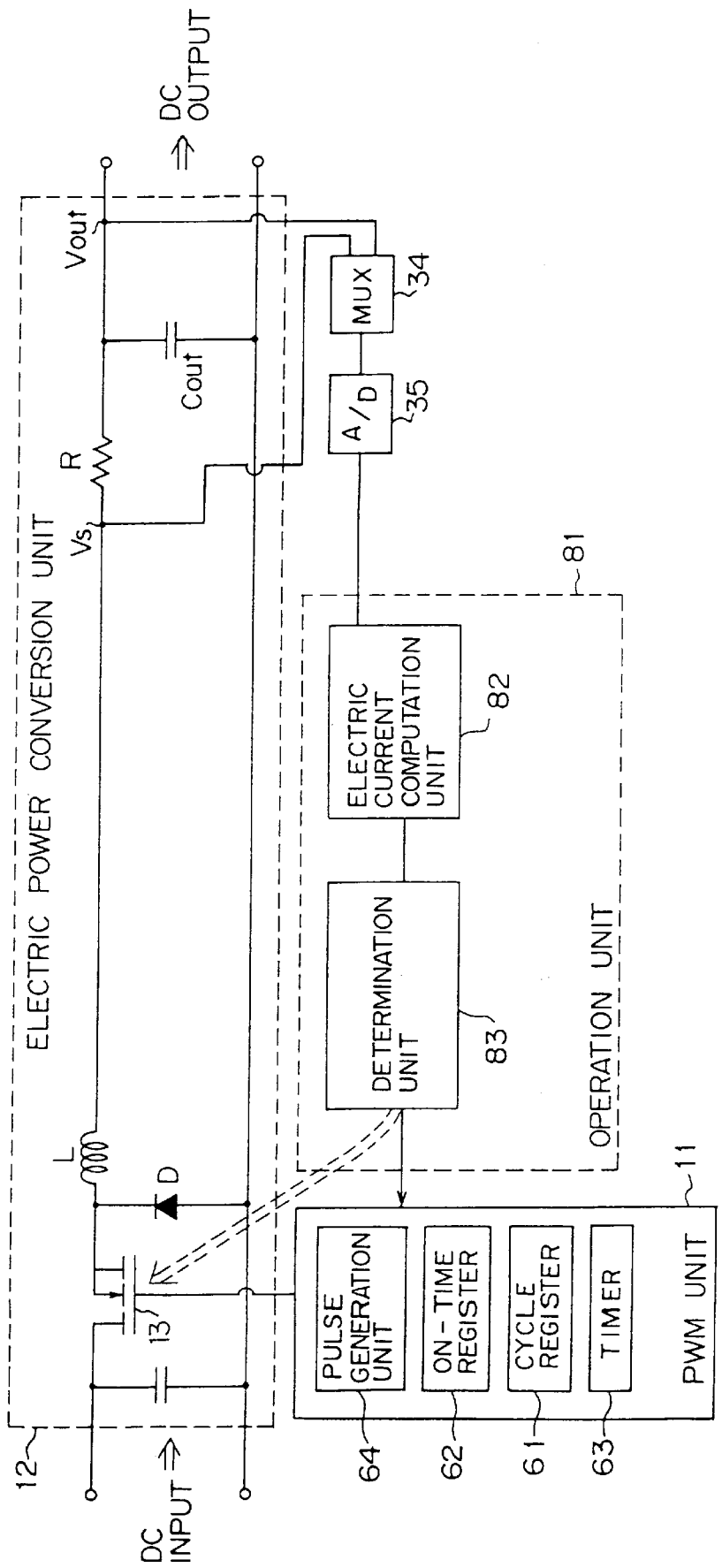
FIG. 11 shows the configuration of the power supply apparatus having the function of protecting an overcurrent.

FIG. 11 shows the configuration of the power supply apparatus capable of protecting against an overcurrent. In this example, the electric power conversion unit 12 outputs potentials (Vout and Vs) at respective ends of the resistor R provided between the inductor L and the output terminal as a parameter relating to an output. These potentials are input to the multiplexing unit 34.

The operation unit 81 estimates the output current of the power supply circuit based on the potentials at respective ends of the resistor R. When an overcurrent is detected, the electric current flowing through the switching element 13 is forcibly reduced or the switching element 13 is forcibly set in an OFF state. Like the operation unit 51 shown in FIG. 5, the operation unit 81 is realized by the processor 41 executing a predetermined program stored in the ROM 42.

Figure 12:
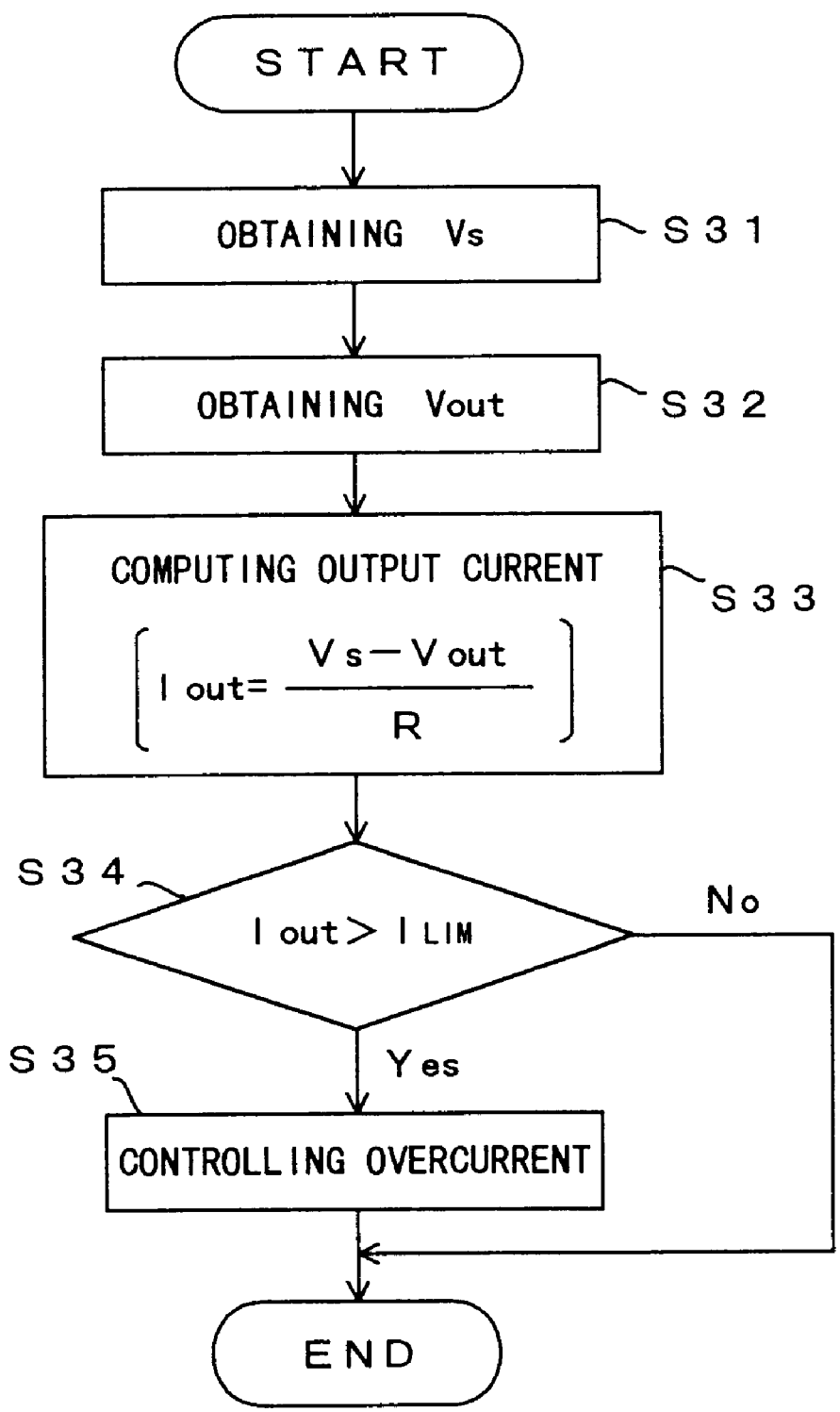
FIG. 12 is a flowchart showing the operation performed by the operation unit.

FIG. 12 is a flowchart showing the operation of the operation unit 81. In steps S31 and S32, the values of the potentials at respective ends of the resistor R are obtained. Then, in step S33, the output current is computed based on the difference between the two values of the electric potential and the value of the resistor R. In step S34, it is checked whether or not the output current exceeds a predetermined upper limit of the electric current.

If the computed output current exceeds the upper limit of the electric current, then an overcurrent controlling process is performed in step S35. An overcurrent controlling process refers to, for example, the following process.
(1) The value of 0 or a value smaller than the on-time computed by the operation unit 51 is forcibly written to the on-time register 62.
(2) A signal for forcibly setting the switching element 13 in the OFF state is transmitted to the electric power conversion unit 12.

The switching element 13 and the load can be protected from an overcurrent by performing the above described processes. If it is determined in step S34 that the computed output current does not exceed the upper limit of the electric current, then the process terminates without performing the overcurrent controlling process. In this case, the on-time computed by the operation unit 51 shown in FIG. 5 is written as is to the on-time register 62.

The power supply circuit according to the above described embodiment has the configuration in which an output voltage is used as a feedback signal for setting the output voltage at a constant value. However, the present invention is not limited to this configuration. The present invention can be applied to a configuration in which the output of the power supply circuit is controlled using an output current (or an inductor current) as a feedback signal, or using an output current (or an inductor current) and an output voltage as a feedback signal.

Figure 13:
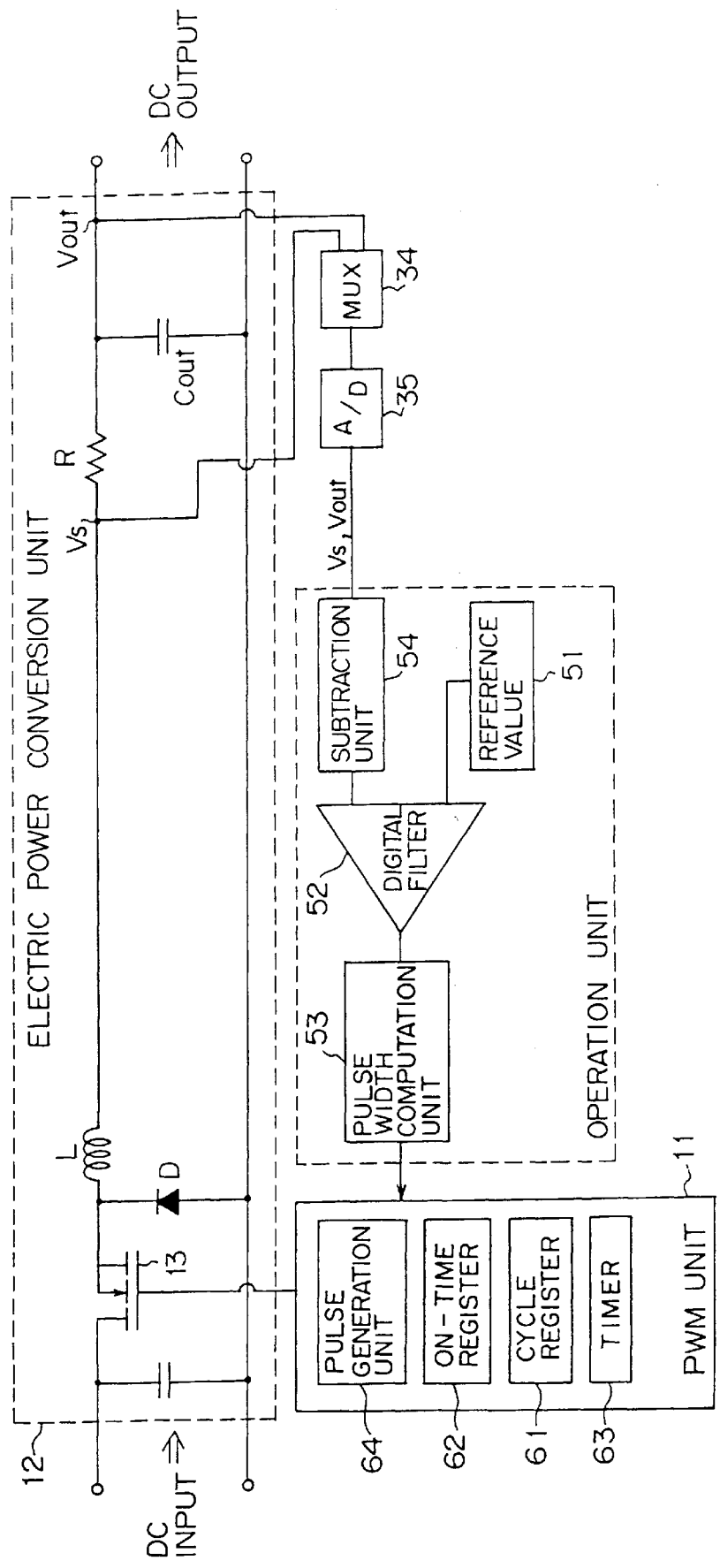
FIG. 13 shows the configuration of the power supply apparatus for controlling the electric power conversion unit based on the output current.

FIG. 13 shows the configuration of the power supply apparatus for controlling the operation of the power supply circuit depending on an output current. This power supply apparatus can be realized by implementing a feature shown in FIG. 11 in the power supply apparatus shown in FIG. 5.

In the power supply apparatus shown in FIG. 13, the operation unit 51 comprises a subtraction unit 54 for computing the difference between the values of the potentials at respective ends of the resistor R. The digital filter 52 amplifies the difference between the output from the subtraction unit 54 and a predetermined reference value. The process of the pulse width computation unit 53 is basically the same as the process described by referring to FIG. 5. That is, the pulse width computation unit 53 computes the on-time based on the output from the digital filter 52, and writes the computed on-time to the on-time register 62.

With the above described configuration, a desired characteristic can be easily obtained by the descriptions of the program corresponding to the operation unit 51. For example, an output current can be easily set, and the drooping characteristic can be easily defined.

Described below is the state control of the power supply circuit. Each of the power supply circuits (the charger 10 and the DC power supplies 20-1 through 20-n) provided in the power supply apparatus according to the present embodiment belongs to one of the four operation states, that is, an ON state, an ON sequence, an OFF state, and an OFF sequence. The ON state and the OFF state respectively refer to the operating state and the stop state. The ON sequence refers to a transition state from the OFF state to the ON state. On the other hand, the OFF sequence refers to a transition state from the ON state to the OFF state.

In the power supply apparatus according to the present embodiment, an input voltage, an output voltage, an output current, a load current, the temperature, etc. are monitored for each power supply circuit. Based on the monitor results, the transition of the operation states of each power supply circuit is controlled. The control is performed by the processor 41.

According to the present embodiment, items A through J shown in FIG. 14 are monitored for control of the state of each power supply circuit. The data relating to the items B and F is transmitted to the processor 41 through the I/O unit 31. The data relating to the items C and G is transmitted to the processor 41 after the input voltage provided for each power supply circuit is converted by the A/D conversion unit 35. The data relating to the other items is output from each power supply circuit, converted by the A/D conversion unit 35, and transmitted to the processor 41.

The determination as to whether or not a transition from a state to another state is required depends on the determination about the items A through J. However, the determination is not required for all items for each state as shown in FIG. 14. For example, assuming that a power supply circuit belongs to the ON state, only the items A through D and J should be monitored.

Figure 15:
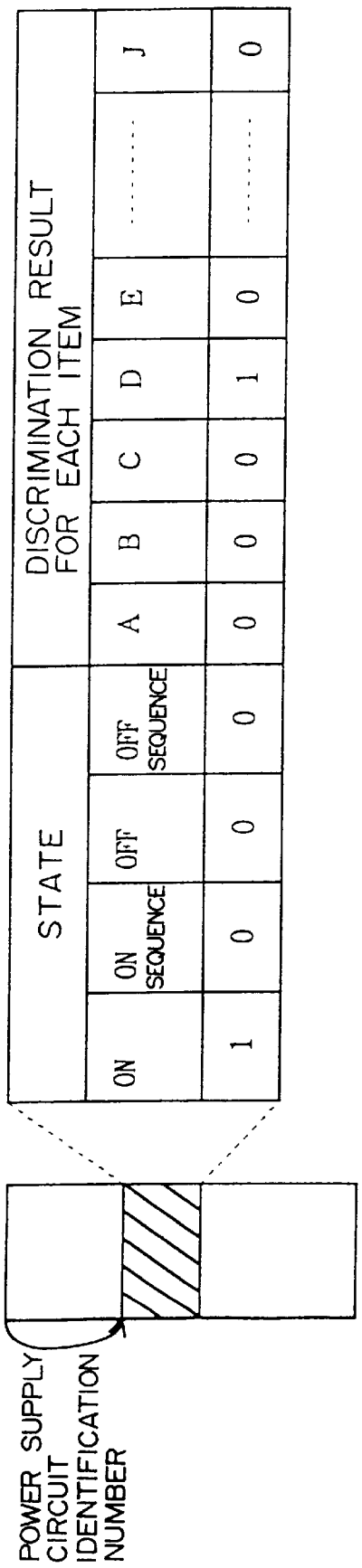
FIG. 15 shows an example of a state management table.

FIG. 15 shows a state management table storing the determination result of each item. The state management table is provided in, for example, a predetermined area of the RAM 43, and generated for each power supply circuit. For each power supply circuit, the current state of the power supply circuit, and the determination result of each item for the power supply circuit are stored in the table. The determination result is stored as a flag. In this example, the flag of 0 is stored when the condition of a corresponding item is satisfied, and the flag 1 is stored when it is not satisfied. In the example shown in FIG. 15, the power supply circuit is in the ON state, and an overcurrent is generated in the power supply circuit.

The state management table is updated at any time by the processor 41. That is, the processor 41 monitors, for example, an input voltage, an output voltage, an output current, a load current, the temperature, etc. at predetermined intervals, and determines whether or not the condition of each item is satisfied each time the monitoring process is performed. The state management table is updated based on the determination result. Also when the state transition of a power supply circuit is detected by a method described later, the state management table is updated.

FIG. 16 shows the state transition of a power supply circuit. The state of the power supply circuit is determined by discrimination equations 1 through 14 shown in FIG. 16. For example, when the current state is the ON state, the discrimination equations 1 through 3 are performed. The current state is recognized by referring to the state management table. Necessary information for a discrimination equation to be performed is read from the state management table.

Each discrimination equation is described as a logic equation in FIG. 16. For example, in the discrimination equation 1, determination results about the detection of an overvoltage, an overcurrent, and a short-circuit respectively as the items A, B, and J are read from the state management table, and a logical sum is computed. If an abnormal condition is detected in at least one of the three items, then the operation result of the logical sum indicates 1, thereby determining that the ON state should be changed into the OFF state.

For further understanding, the discrimination equation 2 is described below. The operation result of the discrimination equation 2 indicates 1 when the conditions that the main switch of the mainframe of the power supply apparatus is in the OFF state or the input voltage is not in a predetermined range, and the condition that none of the overvoltage, the overcurrent, or the short-circuit are generated are simultaneously satisfied. When the operation result of the discrimination equation 2 indicates 1, the state of the power supply circuit changes from the ON state to the OFF sequence.

Thus, since the necessary information for grasping the operation state of each power supply circuit is collectively managed according to the present embodiment, the state control of all power supply circuits can be performed without fail. Additionally, since the above described information is stored as a flag for each discrimination and the state transition can be determined by substituting a flag value in a simple logic equation, the state control of each power supply circuit can be quickly performed without fail.

Figure 17:
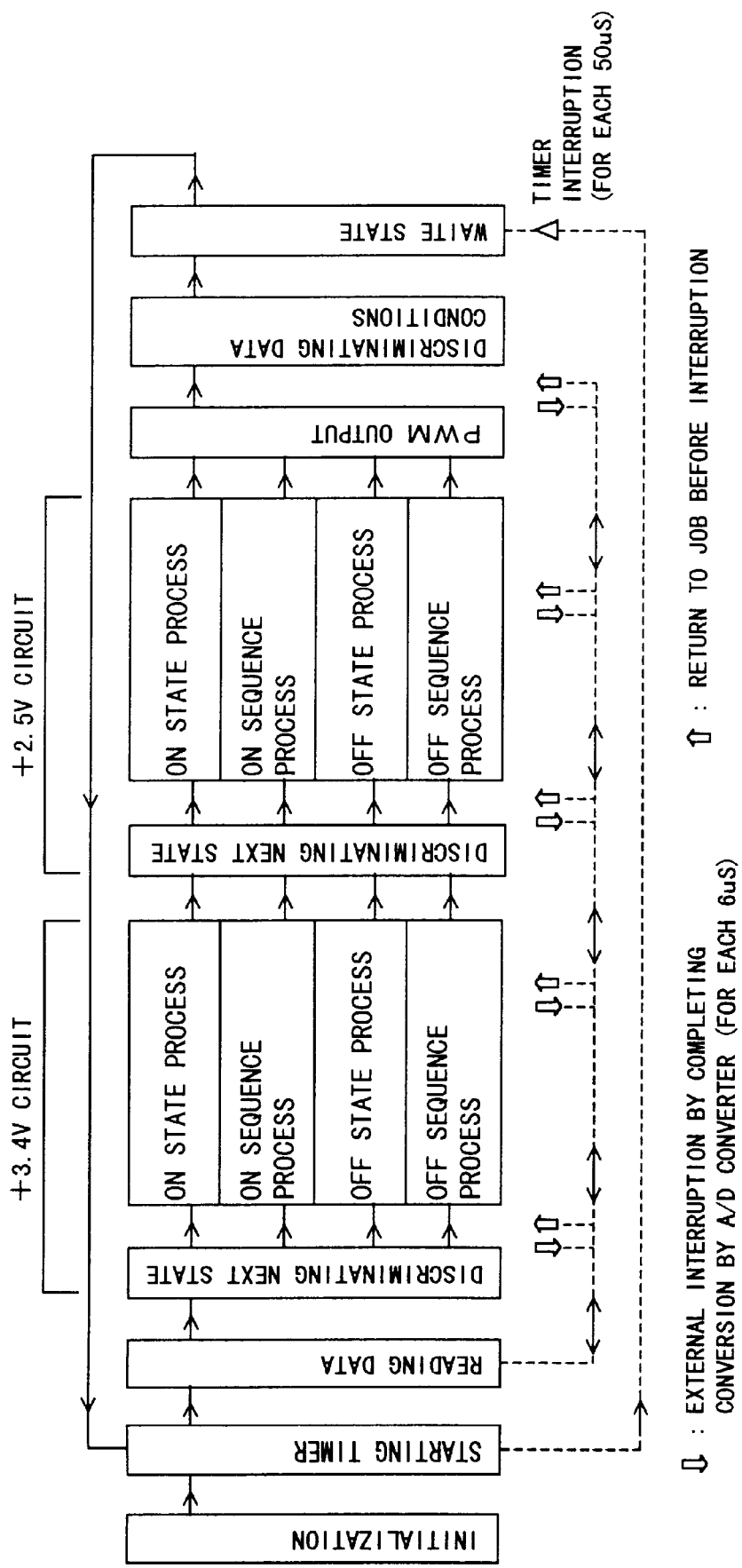
FIG. 17 shows the configuration of the program for controlling the power supply circuit.

FIG. 17 shows the configuration of the program for controlling a power supply circuit. FIG. 18 shows the operation of the program shown in FIG. 17. In this example, two power supply circuits (a 3.4V DC power supply, and a 2.5V DC power supply) are controlled. When the operations of these power supply circuits are controlled, the output voltage for each power supply circuit, the output current for each power supply circuit, and the input voltage to each power supply circuit are used. The output voltage of the 3.4V DC power supply, the output current of the 3.4V DC power supply, the output voltage of the 2.5V DC power supply, the output current of the 2.5V DC power supply, and the input voltage to these power supply circuits are input respectively to input channels CH1 through CH5 of the multiplexing unit 34.

The program for controlling a power supply circuit includes an A/D conversion interruption subroutine and a time interruption subroutine as shown in FIG. 18 in addition to the main program shown in FIG. 17. The main program describes a process relating to the state control of each power supply circuit, a process of generating a pulse signal for PWM control, etc. The A/D conversion interruption subroutine describes a process of specifying an input channel of the multiplexing unit 34 and reading digital data corresponding to the input channel. The timer interruption subroutine is a program for re-executing the main program when a time-out interruption generated at a predetermined time is detected.

The above described program is practically described below. The 'initialization' includes the initialization of each type of register, the setting of a timer (setting the sampling cycle shown in FIG. 18), the setting of an interrupting process, the setting of the PWM unit 11, etc. The setting of the PWM unit 11 includes a process of writing a predetermined value to the cycle register 61, and a process of resetting the ON-time register. The 'starting timer' refers to a process of activating the timer set in the 'initialization'.

The 'reading data' includes a process of indicating an input channel to the multiplexing unit 34, and a process of reading from the A/D conversion unit 35 the digital data corresponding to the indication. In the present embodiment, plural pieces of data are read during each sampling cycle. The first data reading process is described in the main program, and the second and the subsequent processes are described in the A/D conversion interruption subroutine. In this example, the A/D conversion interruption subroutine is invoked after a time required to perform the converting process by the A/D conversion unit 35 has passed since the input channel of the multiplexing unit 34 was specified. The A/D conversion interruption subroutine passes control to the main program if the input channel has been specified and the data has been read.

For example, when the A/D conversion interruption subroutine specifies the input channel CH2 of the multiplexing unit 34 and reads the data from the specified input channel CH1 in the period from T1 to T2, it passes control to the main program. The processor 41 executes the main program in the period from T2 to T3. During the period, for example, the process shown in FIG. 17 is performed. Also during the period, the A/D conversion unit 35 can convert the analog data input thereto into digital data. Therefore, the A/D conversion unit 35 completes the converting process on the analog data input through the input channel CH2 by the time T3. Then, at the time T3, the A/D conversion interruption subroutine is invoked by an interruption. In the period from T3 to T4, the digital data input through the input channel CH2 of the multiplexing unit 34 and converted by the A/D conversion unit 35 is read. At this time, the next input channel is specified, and control is then passed to the main program This process is performed on each input channel.

The 'discriminating next state' is a process described by referring to FIGS. 14 through 16. That is, the current operation state for each power supply circuit is detected, and a flag of the item corresponding to the detected operation state is retrieved. Based on a plurality of retrieved flags, it is determined whether or not the current operation state should be changed into another operation state.

The 'ON state process' refers to a process corresponding to the process in steps S1 through S8 shown in FIG. 7. That is, an output voltage is detected, a digital filter operation is performed, and the on-time of the switching element 13 is determined based on the operation result.

The 'ON sequence process' refers to a process for gradually raising the output voltage of a power supply circuit. To realize the operation, the reference value provided to the digital filter 52 is increased with time. Practically, a register (not shown in the attached drawings) for storing the reference value provided to the digital filter 52 is updated. Each time the reference value is updated, the process corresponding to the process in steps S1 through S8 is performed, and the on-time of the switching element 13 is determined.

The 'OFF state process' refers to a process of maintaining the switching element 13 in the OFF state. In the power supply circuit in which a rectifying diode D is replaced with a transistor, the transistor is also maintained in the OFF state.

The 'OFF sequence process' refers to a process of gradually decreasing the output voltage of a power supply circuit. To realize the operation, the reference value provided to the digital filter 52 is decreased with time. Practically, a register (not shown in the attached drawings) for storing the reference value provided to the digital filter 52 is updated. Each time the reference value is updated, the process corresponding to the process in steps S1 through S8 is performed, and the on-time of the switching element 13 is determined.

The 'PWM output' refers to a process of writing to the on-time register 62 the on-time computed by the 'ON state process', the 'ON sequence process', or the 'OFF sequence process'. In the 'OFF state process', '0' is written to the on-time register 62.

The 'discriminating data conditions' refers to a process of determining each item shown in FIG. 14, and storing the discriminating results in the state management table shown in FIG. 15.

If each of the above described processes has been completed, the time-out of the timer activated by the 'starting timer' is awaited. When the time-out is detected, control is returned to the 'starting timer', and the processes from the 'reading data' to the 'discriminating data conditions' are repeated.

With the above described configuration, the reference value, the factor, etc. given as constants should be variable for each power supply circuit in the program for each power supply circuit. However, they can be basically described as the same expressions. Therefore, even if the number of power supply circuits is to be increased, the program can be easily added or amended.

According to the above described embodiment, the power supply circuit has the configuration in which an output voltage is maintained at a constant value by PWM. However, the present invention is not limited to this configuration. For example, the present invention can be applied to a power supply circuit having the configuration in which an output voltage is controlled by PFM (pulse frequency modulation).

Figure 19:
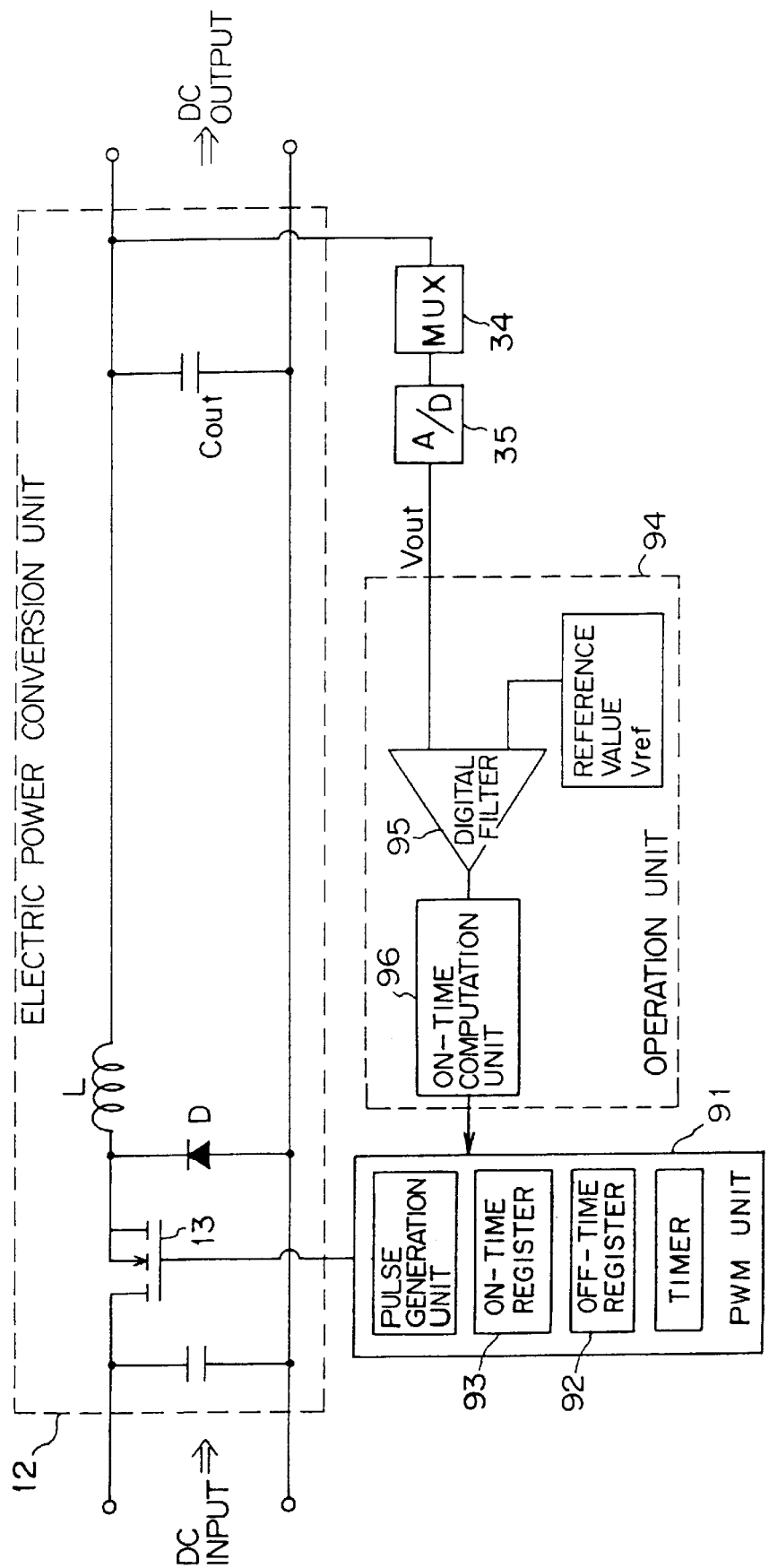
FIG. 19 shows the configuration of the power supply apparatus under PFM control.

FIG. 19 shows the configuration of the PFM-controlled power supply apparatus. The basic configuration of the power supply apparatus is the same as that of the power supply apparatus shown in FIG. 5. However, the PWM unit 11 is replaced with a PFM unit 91. The PFM unit 91 comprises an off-time register 92 and an on-time register 93.

Figure 20:
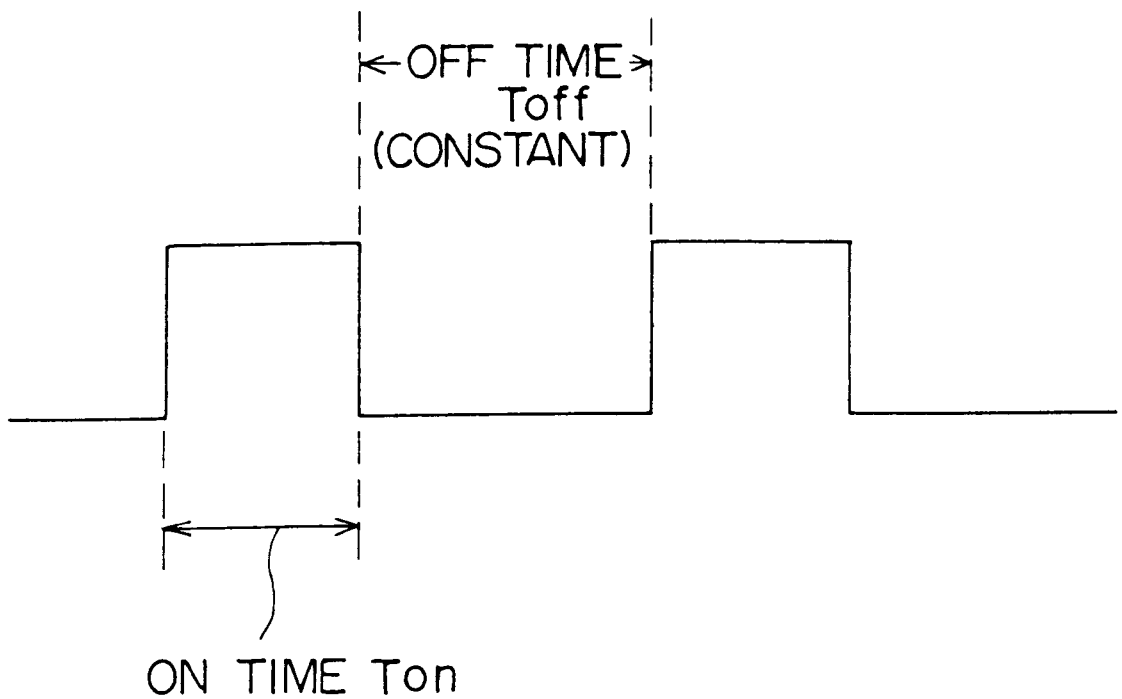
FIG. 20 shows the pulse signal by PFM.

In PFM, the on-time or the off-time of a pulse signal is fixed to a constant value. If the on-time is fixed, the off-time is changed. If the off-time is fixed, the on-time is changed. Thus, the ratio of the on-time and the off-time of a pulse signal can be varied. In the example shown in FIG. 20, the off-time is fixed.

When a pulse signal is generated with the off-time fixed, a predetermined off-time is set in the off-time register 92 during the initialization. The on-time register 93 is updated each time the on-time is computed by an operation unit 94. Then, the PFM unit 91 generates a pulse signal according to the settings of the registers. The factor of a digital filter 95, and a computation equation used in an on-time computation unit 96 are not always the same as the factor of the digital filter 52 and the computation equation used in the pulse width computation unit 53.

Since an output from a power supply circuit is controlled by software, the conventional analog circuit is not required, and a circuit scale becomes smaller. Additionally, since the process is performed by software, an output voltage of a power supply circuit can be controlled to be maintained at a constant level, and a high-level of control can be easily realized. Furthermore, since a plurality of power supply circuits can be collectively processed, the number of power supply circuits can be easily changed.

What is claimed is:

1. A power supply apparatus having a power supply circuit for generating DC output, comprising:

a converter converting at least two parameters among an output voltage of the power supply circuit, an output current of the power supply circuit, an input voltage provided to the power supply circuit, and a load current of the power supply circuit into digital data;

a determination unit determining whether or not each of the at least two parameters converted to the digital data by said converter satisfies predetermined corresponding conditions; and a controller controlling the power supply circuit based on a combination of the at least two determination results obtained by said determination unit, and a storage unit storing the determination results by said determination unit as flags wherein:
said controller controls the power supply circuit based on the flags stored in said storage unit.

2. The apparatus according to claim 1 wherein:

said power supply circuit belongs to one of a plurality of preliminarily defined operation states; and said controller recognizes an operation state which the power supply circuit should next enter based on a current operation state of the power supply circuit and the plurality of determination results obtained by said determination unit, and performs control based on recognition results.

3. A power supply apparatus, comprising:

a plurality of power supply circuits each of which generates DC output;

a converter converting a parameter relating to an output from each of said plurality of power supply circuits into digital data;

a controller controlling the output from said plurality of power supply circuits based on the digital data obtained by said converter; and a multiplexer receiving output parameters from said plurality of power supply circuits, and outputting the output parameters to said converter according to an instruction from said controller.

4. A power supply apparatus having a plurality of power supply circuits belonging to one of a plurality of predetermined operation states, comprising:

a converter converting at least two parameters among output voltages of the plurality of power supply circuits, output currents of the plurality of power supply circuits, input voltages provided to the plurality of power supply circuits, and load currents of the plurality of power supply circuits into digital data;

a determination unit determining whether or not each of the at least two parameters converted to the digital data by said converter satisfies predetermined corresponding conditions;

a controller recognizing an operation state which each of the power supply circuits should next enter based on a combination of the at least two determination results obtained by said determination, unit and performing control based on recognition results; and a storage unit storing the determination results by said determination unit as flags wherein:
said controller controls the power supply circuit based on the flags stored in said storage unit.

5. A power supply apparatus having a power supply circuit whose DC output is controlled by a PWM system, comprising:

conversion unit converting an output parameter relating to an output from the power supply circuit;

operation unit computing information specifying a duty of a pulse signal to be provided for the power supply circuit based on a difference between the digital data obtained by said conversion unit and a reference value; and generation unit generating a pulse signal to be provided for the power supply circuit according to the information computed by said operation unit, wherein
said operation unit limits a maximum value of the duty to a predetermined threshold, when computed duty is larger than the threshold.

6. A power supply apparatus having a power supply circuit whose DC output is controlled by a PWM system, comprising:

conversion unit converting an output parameter relating to an output from the power supply circuit;

operation unit computing information specifying a duty of a pulse signal to be provided for the power supply circuit based on a difference between the digital data obtained by said conversion unit and a reference value;

storage unit storing the information computed by said operation unit;

rewriting unit rewriting said storage unit when newly computed information is different from stored information in said storage unit; and generating unit generating a pulse sign to be provided to the power supply circuit according to the information stored in said storage unit.

7. A power supply apparatus having a power supply circuit whose DC output is controlled by a PWM system, comprising:

conversion unit converting an output parameter relating to an output from the power supply circuit;

operation unit computing information specifying a duty of a pulse signal to be provided for the power supply circuit based on a difference between the digital data obtained by said conversion unit and a reference value;

detecting unit detecting an output current of the power supply circuit;

storage unit storing the information computed by said operation unit when the detected current is smaller than a predetermined threshold, and storing information which specifies a duty smaller than the computed duty when the detected current is larger than the threshold; and generating unit generating a pulse signal to be provided to the power supply circuit according to the information stored in said storage unit.

* * * * *